(12) United States Patent
Goto et al.

(10) Patent No.: US 6,245,599 B1
(45) Date of Patent: Jun. 12, 2001

(54) CIRCUIT WIRING SYSTEM CIRCUIT WIRING METHOD SEMI-CONDUCTOR PACKAGE AND SEMI-CONDUCTOR PACKAGE SUBSTRATE

(75) Inventors: Akihiro Goto; Hirochika Kawaguchi; Yoshiharu Takahashi, all of Tokyo; Takao Takahashi, Hyogo; Takashi Arita, Hyogo; Satoshi Ookyuu, Hyogo; Hirokazu Taki, Osaka, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,508

(22) Filed: Dec. 8, 1999

(30) Foreign Application Priority Data

Jun. 30, 1999 (JP) .................................. 11-184545

(51) Int. Cl.[7] ......................... H01L 21/66; H01L 21/00; H01L 21/82; H01L 21/44; H01L 23/48
(52) U.S. Cl. ......................... 438/129; 438/599; 438/613; 438/666
(58) Field of Search .................................. 257/738, 773; 29/25.01; 439/129, 599, 613, 666, FOR 343

(56) References Cited

U.S. PATENT DOCUMENTS 5,212,107 * 5/1993 Suzuki .

5,264,390 * 11/1993 Nagase .

FOREIGN PATENT DOCUMENTS

| 58-112383 | 7/1983 | (JP) . |
| 3-24763 * | 2/1991 | (JP) . |
| 5-67178 | 3/1993 | (JP) . |
| 6-45443 | 2/1994 | (JP) . |

* cited by examiner

*Primary Examiner*—David E. Graybill
(74) *Attorney, Agent, or Firm*—Burns, Doane, Swecker & Mathis, LLP

(57) ABSTRACT

The primary objective of the present invention is to select a connecting combination of the plurality of solder ball connection pads and the plurality of wire bond pads, and generate an optimum wiring candidate. For this objective, the wiring pattern generation unit generates a wiring pattern as the information for specifying an in-area wiring route to be wired in each row and an in-area wiring route to be connected to the next row among the solder ball connection pad area closer to the wire bond pad area, based on the design conditions of the wiring route stored in the design condition memory. Then, the wiring plan generation unit generates a wiring plan laying out the plurality of wiring routes by combining the wiring patterns generated for each row, and the wiring rule check unit selects some of the generated wiring plans suited for the wiring rules and generates the plurality of wiring candidates. Furthermore, the quality rating unit rates the generated wiring candidates and selects the best wiring candidate.

17 Claims, 26 Drawing Sheets

Fig. 6

| ARRAY CONDITION | | |
|---|---|---|
| ITEM | VALUE | UNIT |
| NO. OF VERTICAL ROWS (N) | 6 | ROW |
| NO. OF HORIZONTAL ROWS (M) | 6 | ROW |
| NO. OF VERTICAL WIRES (NF) | 9 | WIRE |
| NO. OF HORIZONTAL WIRES | 9 | WIRE |
| NO. OF DESIGN CANDIDATES TO BE OBTAINED | 1 | CANDIDATES |

| WIRING RULE | | |
|---|---|---|
| ITEM | VALUE | UNIT |
| MAX. NO. FOR WIRING (V) | 2 | WIRE |
| LINE WIDTH (LW) | 0.04 | mm |
| WIRING SPACE (LS) | 0.04 | mm |
| SOLDER BALL CONNECTION PAD-WIRING SPACE (LB) | 0.05 | mm |

Fig. 22

| ARRAY CONDITION | | | |
|---|---|---|---|
| DESIGN CONDITION | VALUE | UNIT | EXPLANATION |
| NO. OF VERTICAL ROWS(N) | 18 | ROW | NO. OF BALLS ON VERTICAL ROWS |
| NO. OF HORIZONTAL ROWS(M) | 18 | ROW | NO. OF BALLS ON HORIZONTAL ROWS |
| NO. OF PERIPHERAL ARRANGEMENTS(C) | 5 | ROW | |
| NO. OF VERTICAL WIRINGS(NF) | 50 | WIRE | |
| NO. OF HORIZONTAL WIRINGS(MF) | 50 | WIRE | |
| DIAGONAL LAND CONNECTION | 0 | - | 0: CONNECTED ONLY TO ONE SIDE 1: CONNECTED TO BOTH SIDES |
| WIRING TO INDEX CORNER | 0 | - | 0: WIRED 1: NOT WIRED |
| NO. OF DESIGN CANDIDATES TO BE OBTAINED | 10 | CANDIDATES | |

| WIRING RULE | | | |
|---|---|---|---|
| ITEM | VALUE | UNIT | EXPLANATION |
| MAX. NO. FOR WIRING | 3 | WIRE | |

Fig. 23

| RATING ITEM | ELECTRICAL CHARACTERISTICS | | | | RATING | |
|---|---|---|---|---|---|---|
| CANDIDATE NUMBER | TOTAL WIRING LENGTH | MAXIMUM ROUTE LENGTH | WIRING LENGTH DISPERSION | SIMPLICITY | SCORE | RANKING |
| 52 | 110.106 | 4.544 | 1.118 | 254 | 3 | 10 |
| 144 | 107.054 | 4.066 | 0.970 | 242 | 46 | 6 |
| 248 | 103.315 | 4.636 | 0.966 | 230 | 41 | 7 |
| 253 | 103.840 | 4.158 | 0.996 | 230 | 50 | 5 |
| 298 | 102.620 | 4.023 | 0.935 | 228 | 65 | 4 |
| 407 | 99.466 | 3.518 | 0.855 | 216 | 100 | 1 |
| 449 | 103.130 | 3.519 | 0.924 | 228 | 80 | 2 |
| 580 | 106.275 | 4.048 | 1.042 | 240 | 39 | 9 |
| 629 | 104.872 | 3.530 | 0.940 | 236 | 71 | 3 |
| 647 | 106.881 | 4.048 | 1.020 | 242 | 40 | 8 |

Fig. 24

| RATING ITEM | ELECTRICAL CHARACTERISTICS | | | MECHANICAL CHARACTERISTICS | RATING | |
|---|---|---|---|---|---|---|
| CANDIDATE NUMBER | TOTAL WIRING LENGTH | MAXIMUM ROUTE LENGTH | WIRING LENGTH DISPERSION | SIMPLICITY | MANUFACTURING COST | SCORE | RANKING |
| 52 | 110.1057 | 4.5439 | 1.118 | 254 | 2 | 49 | 6 |
| 144 | 107.0544 | 4.0655 | 0.970 | 242 | 3 | 46 | 7 |
| 248 | 103.3146 | 4.6358 | 0.966 | 230 | 3 | 41 | 8 |
| 253 | 103.8405 | 4.1580 | 0.996 | 230 | 3 | 50 | 5 |
| 298 | 102.6203 | 4.0231 | 0.935 | 228 | 3 | 65 | 4 |
| 407 | 99.4663 | 3.5180 | 0.855 | 216 | 3 | 100 | 1 |
| 449 | 103.1297 | 3.5191 | 0.924 | 228 | 3 | 80 | 2 |
| 580 | 106.2752 | 4.0479 | 1.042 | 240 | 3 | 39 | 10 |
| 629 | 104.8721 | 3.5303 | 0.940 | 236 | 3 | 71 | 3 |
| 647 | 106.8805 | 4.0479 | 1.020 | 242 | 3 | 40 | 9 |

INDEX CORNER

CIRCUIT WIRING SYSTEM CIRCUIT WIRING METHOD SEMI-CONDUCTOR PACKAGE AND SEMI-CONDUCTOR PACKAGE SUBSTRATE

FIELD OF THE INVENTION

This invention relates to an automatic wiring in designing a substrate of a circuit wiring system of semi-conductor package substrates, for example, a ball grid array (BGA) package or chip scale package (CSP), and quality rating of a wiring route.

BACKGROUND OF THE INVENTION

In designing a substrate for a ball grid array (BGA) package or a chip scale package (CSP) which is hailed as the mainstream of a future LSI (large-scale integrated circuit) packaging system designed for high-density packaging, it will become necessary to improve quality of wiring routes by improving the efficiency of wiring route design, and at the same time, performing the inspection on the conformity to wiring rules. Furthermore, a technology valid for automatic wiring in substrate designing, which rates based on the quality standard for rating quality of wiring routes through introduction of a rating function will be required.

For a BGA substrate shown as one example in FIG. 4, solder ball connection pads 2 are arranged in the center of the BGA substrate, and wire bond pads 5 are arranged around the outside circumference of the solder ball connection pads 2.

Now, let us assume that, in the above BGA substrate, the solder ball connection pads 2 and wire bond pads 5 are connected as shown in FIG. 4. In this case, under such design condition that the wire bond pads 5 can be connected to any of the solder ball connection pads 2 (free connection), there are many combinations of the wire bond pads 5 and solder ball connection pads 2, therefore it took time in determining the wiring route.

The Print Circuit Board Wiring Method, the Japanese Patent Examination SH058-112383, disclosed the method of generating candidates for possible wiring routes based on the connection relationship between the pre-designated wire bond pads and solder ball connection pads, and selecting the wiring route by considering wiring length, and so on.

Another technique disclosed in the Japanese Patent Examination HEI05-67178 is designed to improve wiring processing at higher speed and the wiring performance. The conventional technique is an automatic wiring processing method characterized by estimating the conjestion of wiring on the substrate, setting the area for separating the substrate larger than the specified value when the wiring conjestion is higher than the specified value so that the wiring can be easily succeeded, and setting the area for separating the substrate smaller than the specified value when the wiring conjestion is smaller than the specified value so that the time for wiring processing can be minimized, and by completing the wiring on the entire substrate by wiring for each area having different size. In this conventional technique, after inputting the input-side pin, output-side pin, and the wiring information between the pins on the input side and the output side, and disclosed the method of wiring processing the wiring result satisfied the wiring rule at high speed.

With regard to the improvement of the automatic wiring ratio by uniforming wiring conjestion, there is a technique disclosed in Japanese Patent Examination HEI06-45443. This conventional technique is about the layered wiring method in which a reflexive division of a wiring area is repeated, and in each divided layer, in an automatic wiring method of semiconductor integrated circuit which determines the route passing position of a set (hereinafter called the net) of circuit pins (hereinafter called the pins) of a same electric potential on the division line by using an optimization algorithm, the wiring area is divided into four parts by vertically and horizontally at the same time, and determines the passing position of the route of the net on the four division lines. In this leyered wiring method, after the pins on the input side, the pins on the output side, and the wiring information between the pins on the input side and the output side are input, when a cirtuit drawing is made to a wiring substrate drawing, a finalized wiring information is laid out into the wiring substrate drawing, the division of the wiring area into four parts is reflectively repeated so that the wiring substrate is subdivided by 4×m, and the route pattern on the area divided into four parts, and the net passing position on the four division lines are determined and the wiring route decision for route optimization (the shortest route determination) is automatically designed.

The conventional art relates to the method of drawing a substrate diagram by automatically designing the wiring route which performs the optimization of the writing route, where the input pin information targeted for connection and the output pin information targeted for connection, and the circuit information such as wiring rules or wiring limitation are already known. Therefore, the conventional art is limited to solving the wiring route optimization problems on the plane, such as the intersection of the wiring routes, overlapping the wiring routes, or the existence of an obstacle area which is forced to detour by the wiring routes.

In this way, in the conventional determination method of wiring routes, the combination of connecting the wire bond pads and solder ball connection pads had to be determined beforehand. Furthermore, it also took much time in determining the candidates for the combination of connections. Therefore, the wiring route determination took a lot of time because there were lots of connection combinations in the method of connecting wiring routes freely without determining the combination of the above connections.

Therefore, in the conventional art, the combination of connecting the wire bond pads and solder ball connection pads had to be firstly made. For example, if the number of wire bond pads is assumed to be n and the number of solder ball connection pads to be m, then there are $_mC_n$ units combinations when m>n. Selecting an optimal connection combination out of the $_mC_n$ units combinations can be regarded as the wiring route optimization problem on the BGA or CSP.

As an example, suppose if an electrode on the semiconductor chip is the input pin, and an electrode on the semi-conductor package substrate is the output pin, then it is to solve the problem of seeking a possible output pin as well as the possible maximum number of wiring routes on the semiconductor package substrate when only the input pin information is known.

To seek the solution of this problem, first of all, the possible maximum number of wiring routes is obtained, and then the number of output pins which can be connected to the wiring routes is obtained. Then, quality standard is set for the output pins, and the maximum and minimum values of the quality standard are obtained based on the rating function so as to obtain the wiring route determination method which performs optimization of the wiring routes.

As shown in FIG. 4, the wire bond pads 5 are arranged on the outside circumference of the solder ball connection pads 2, and a case in which the wire bond pads 5 and the solder ball connection pads 2 are wired like a wiring 3 is considered. The wire bond pads 5, under the design condition in which they can be connected to any solder ball connection pads 2, which are connected to one wire bond pads 5, there are combinations equivalent to the number of solder ball connection pads 2, and furthermore, there is a plurality of wiring routes regarding the combination of one connection.

The prime objective of this invention is to automatically select a combination of connecting a plurality of first pins and a plurality of second pins, select an optimal route and to layout a wiring route.

Another objective of this invention is to offer a rating result based on which the optimal wiring route is selected by rating the laid out wiring route based on the quality standard.

SUMMARY OF THE INVENTION

A circuit wiring system may comprise a design condition memory for storing a layout information of a first pin area in which a plurality of first pins may be arrayed two-dimensionally on a plane, a layout information of a second pin area in which a plurality of second pins to be connected with each of the plurality of first pins may be arranged, and a design condition of a wiring route for connecting the plurality of first pins and the plurality of second pins, and a wiring candidate generator for generating at least one wiring candidate by generating a connection combination for the plurality of first pins and the plurality of second pins, by laying out a plurality of wiring routes including a wiring route which may connect at least one of the second pins to one of the first pins passing through two adjacent first pins in the first pin area, based on the design conditions stored in the design condition memory.

The circuit wiring system, wherein the wiring candidate generator may divide the first pin area into a plurality of divided first pin areas, and may lay out a bunch of wiring routes passing through each of the plurality of divided first pin areas, as a plurality of in-area wiring routes and generates the plurality of wiring routes by combining the plurality of in-area wiring routes laid out in each of the plurality of divided first pin areas.

The circuit wiring system, wherein
the wiring candidate generator may divide the first pin area into a near area closer to the second area and a far area and a far area far from the second pin area, and may lay out a bunch of wiring routes passing through the near area as a plurality of in-area wiring routes which may be used to connect the plurality of second pins to the plurality of first pins arranged in the far area,
may divide the far area further into a near area closer to the second pin area and a far area far from the second pin area,
and may generate two or more sets of a plurality of in-area wiring routes, for a plurality of divided first pin areas by repeating the process of laying out a plurality of in-area wiring routes on a divided near area, may connect two or more sets of the plurality of the in-area wiring routes in the plurality of areas, in order to determine the plurality of wiring routes between the plurality of first pins and the plurality of second pins.

The circuit wiring system, wherein the wiring candidate generator may calculate a number of unconnected lines by subtracting the number of the plurality of first pins arranged in the near area and targeted to be connected to the plurality of second pins from the number of connections of the plurality of wiring routes to be laid out in the first pin area, and may lay out the plurality of in-area wiring routes as many as the number of unconnected lines in the near area.

The circuit wiring system, wherein the near area may be one row area on which the plurality of first pins may be arrayed.

The circuit wiring system, wherein the design condition stored in the design condition memory may include the plurality of wiring rules one of rules specifying a maximum number for wiring for wiring between the two adjacent first pins of the one row.

The circuit wiring system, wherein the wiring candidate generator may further include a wiring pattern generation unit which may generate a plurality of wiring patterns for each of the divided first pin areas, each of the plurality of wiring routes including the layout information of the plurality of in-area wiring routes for the number of unconnected lines for each first pin area, and information which may specify the plurality of in-area wiring routes to be connected to the plurality of first pins, and a wiring plan generation unit which may select each of the plurality of wiring patterns in each of the divided first pin areas, and may generate a plurality of wiring plans by laying out the plurality of wiring routes by connecting the each of the plurality of wiring patterns selected from each of the divided first pin areas, and a wiring rule check unit which may select a wiring plan satisfying the wiring rules stored in the design condition memory, as the wiring candidate.

The circuit wiring system, wherein the wiring pattern generation unit may lay out the plurality of in-area wiring routes passing between the two adjacent first pins of the one row from a center to outsides preferentially between the two adjacent first pins arranged in a center of the one row, and then may lay out sequentially between the two adjacent first pins arranged outside of each row.

The circuit wiring system, wherein the wiring rule check unit may select the wiring plan which may make the number of connections between the two adjacent first pins below or equal to the maximum number for wiring as the wiring candidate.

The circuit wiring system, wherein the plurality of first pins may be arrayed in a quadrangle shape in the first pin area, the plurality of second pins may be arranged outside the first pin area, the wiring pattern generation unit may divide a wiring area to a plurality of divided wiring areas in each of which the wiring routes may be laid out, and may generate the plurality of wiring patterns in the divided first pin areas for each of the divided wiring areas, and the wiring plan generation unit may generate the plurality of wiring plans for each of the plurality of divided wiring area, and may generate the wiring plan for the entire wiring area by connecting the plurality of wiring plans generated.

The circuit wiring system, wherein the circuit wiring system may further include a quality standard memory for storing a quality standard which may become the standard for rating the quality of the wiring, and a quality rating unit for rating the quality of the wiring candidates generated by the wiring candidate generator based on the quality standard stored in the quality standard memory.

The circuit wiring system, wherein the wiring candidate generator may generate the plurality of wiring candidates, and the quality rating unit may rate the quality of the plurality of the wiring candidates.

The circuit wiring system, wherein the plurality of first pins may be solder ball connection pads of a ball grid array (BGA) package, and the plurality of second pins may be wire bond pads to be connected with semi-conductor elements with a wire.

A circuit wiring method for generating a wiring candidate by laying out a wiring route between a plurality of first pins arrayed two-dimensionally on a plane, and a plurality of second pins to be connected with each of the plurality of first pins is arranged on the plane and connected with the plurality of first pins may comprise the steps of:

inputting a layout information of a first pin area in which the plurality of first pins may be arrayed, a layout information of a second pin area in which the plurality of second pins may be arranged, and a design condition of a wiring route for connecting the plurality of first pins and the plurality of second pins, and generating at least one wiring candidate by generating a connection combination for the plurality of first pins and the plurality of second pins, by laying out a plurality of wiring routes including a wiring route which may connect at least one of the second pins to one of the first pins passing through two adjacent first pins in the first pin area, based on the design conditions input by the design condition storing step.

A semi-conductor package substrate provided with a plurality of first pins arrayed two-dimensionally on a plane, and a plurality of second pins arranged on a same plane, to be connected to the plurality of first pins may comprise a design condition memory for storing a layout information of a first pin area in which the plurality of first pins may be arrayed two-dimensionally on the plane, a layout information of a second pin area in which the plurality of second pins to be connected with each of the plurality of first pins may be arranged, and a design condition of a wiring route for connecting the plurality of first pins and the plurality of second pins, and a wiring candidate generator for generating at least one wiring candidate by generating a connection combination for the plurality of first pins and the plurality of second pins, by laying out a plurality of wiring routes including a wiring route which may connect at least one of the second pins to one of the first pins passing through two adjacent first pins in the first pin area, based on the design conditions stored in the design condition memory.

A semi-conductor package provided with a package substrate having a plurality of first pins arrayed two-dimensionally on a plane and a plurality of second pins arranged on a same plane and to be connected to each of the plurality of first pins may comprise a design condition memory for storing a layout information of a first pin area in which the plurality of first pins may be arrayed two-dimensionally on a plane, a layout information of a second pin area in which a plurality of second pins may be arranged and connected to each of the plurality of first pins, and a design condition of a wiring route for connecting the plurality of first pins and the plurality of second pins, and a wiring candidate generator for generating at least one wiring candidate by generating a connection combination for the plurality of first pins and the plurality of second pins, by laying out a plurality of wiring routes including a wiring route which may connect at least one of the second pins to one of the first pins passing through two adjacent first pins in the first pin area, based on the design conditions stored in the design condition memory.

A circuit wiring system may comprise:

a design condition memory for storing a layout information of a first pin area in which a plurality of first pins is arrayed two-dimensionally on a plane, a layout information of a second pin area in which a plurality of second pins to be connected with each of the plurality of first pins is arranged, and a design condition of a wiring route for connecting the plurality of first pins and the plurality of second pins, and a wiring candidate generator for laying out the plurality of wiring routes including at least one of the wiring routes passing through the plurality of first pins, and generating a wiring candidate for connecting with each of the plurality of second pins and the plurality of first pins, using the plurality of wiring routes, based on design conditions stored in the design condition memory.

BRIEF DESCRIPTION OF THE DRAWINGS

Other object features, and advantages of the invention will be apparent from the following description when taken in conjunction with the accompanying drawings.

FIG. 6 gives an example of design conditions of the circuit wiring of the package substrate shown in FIG. 4;

FIG. 22 shows an example of design condition used for embodiment 2;

FIG. 23 shows an example of a quality rating (electrical characteristics) result of wiring candidates generated in embodiment 2;

FIG. 24 shows one example of quality rating (electrical characteristics and mechanical characteristics) result of wiring candidates generated in embodiment 2;

DESCRIPTION OF THE PREFERRED EMBODIMENTS

Embodiment 1

Figure 1:
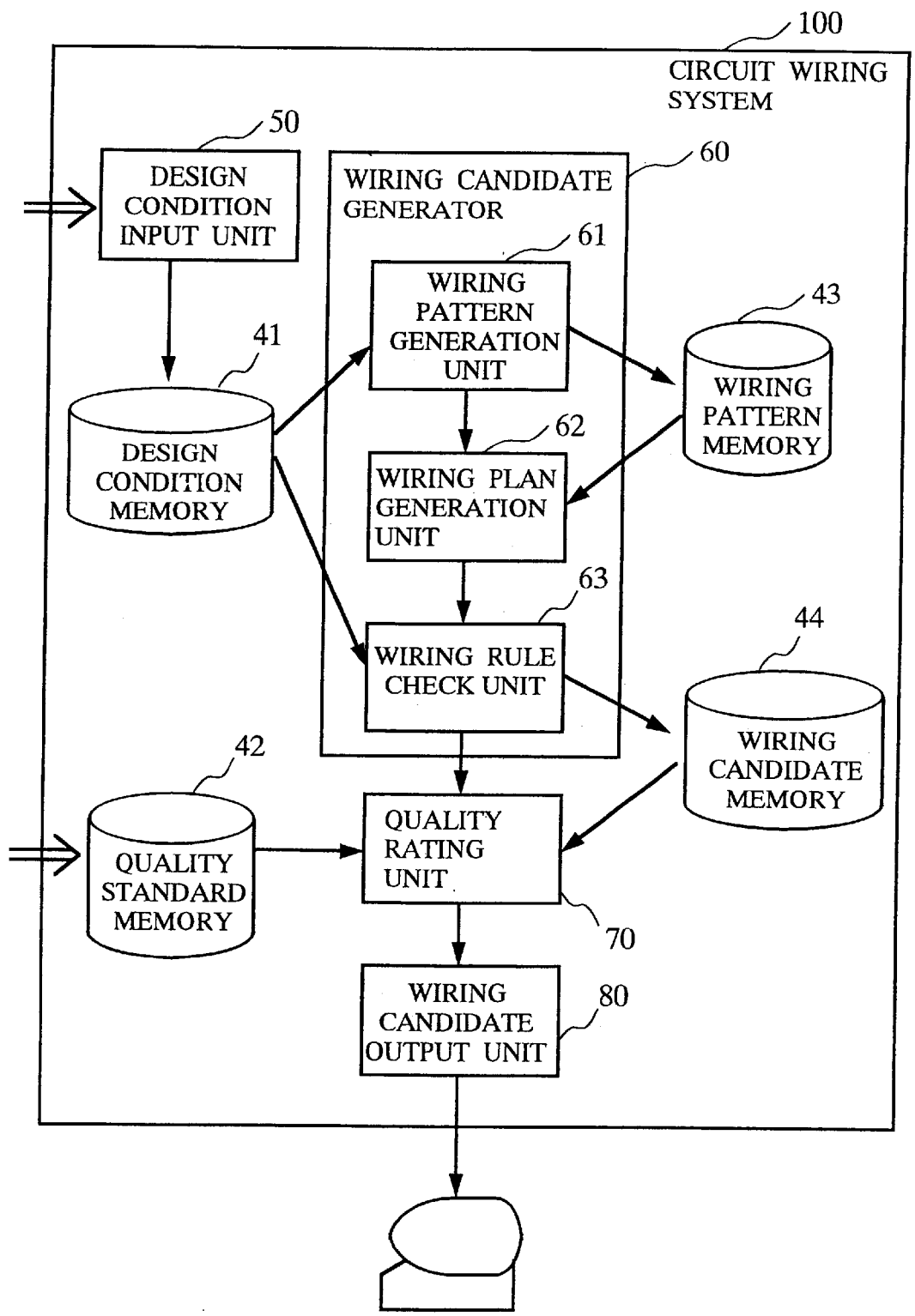
FIG. 1 shows an example of a configuration of a circuit wiring system 100 of one embodiment of this invention.

FIG. 1 shows an example of a configuration of a circuit wiring system 100 of the present invention.

In this embodiment, using the circuit wiring system shown as an example in FIG. 1, an example of generating wiring candidates for the circuit of the package substrate of the BGA (Ball Grid Array) semi-conductor is explained. In concrete, a case of freely connecting a plurality of solder ball connection pads 2 (first pins) arrayed two-dimensionally on the package substrate to a plurality of wire bond pads 5 (second pins) connected to each of the above-mentioned plurality of the solder ball connection pads 2 arranged on the package substrate is explained.

Although the BGA semi-conductor package is taken up as one example, it goes without saying that it is not limited to the BGA semi-conductor package.

The is applied to a circuit wiring for connecting a plurality of first pins arranged two-dimensionally on a plane to a plurality of second pins arranged outside of the area in which the plurality of the first pins is arranged on the same one plane. In addition, the shape of the array of the plurality of the first pins is not limited to quadrangle (square), but circle, oval, for example, can be applied.

The circuit wiring system 100 shown as one example in FIG. 1 is provided with the following components.

41 indicates a design condition memory which stores a layout information of the first pin area (hereinafter a solder ball connection pad area as one example of this embodiment) in which the plurality of first pins (hereinafter solder ball connection pads 2 as one example of this embodiment) is arrayed two dimensionally on a plane, and a layout information of the second pin area (hereinafter a wire bond pad area as one example of this embodiment) in which the plurality of second pins (hereinafter wire bond pads 5 as one example of this embodiment) to be connected with the above-mentioned first pins, respectively, is arranged, and a design condition of wiring routes for connecting the plurality of solder ball connection pads 2 with the plurality of wire bond pads 5.

In this embodiment, solder ball connection pads 2 are treated as one example of the first pins, and wire bond pads 5 are treated as one example of the second pins as described above. However, the first pins and second pins are not limited to these types of components.

42 indicates a quality standard memory for storing a quality standard which becomes the basis on which a wiring quality is rated.

50 indicates a design condition input unit for inputting the design condition.

60 indicates a wiring candidate generator for generating wiring candidates.

70 indicates a quality rating unit for rating the quality of wiring candidates generated by the wiring candidate generator 60 based on the quality standard stored in the quality standard memory 42.

80 indicates a wiring candidate output unit for outputting the generated wiring candidates.

The wiring candidate generator 60 is equipped with a wiring pattern generation unit 61, a wiring plan generation unit 62, and a wiring rule check unit 63. The details of their configuration are described later.

In addition, the circuit wiring system 100 has a wiring pattern memory 43 for storing wiring patterns generated by the wiring pattern generation unit 61, and a wiring candidate memory 44 for storing wiring candidates selected by the wiring rule check unit 63.

Figure 2:
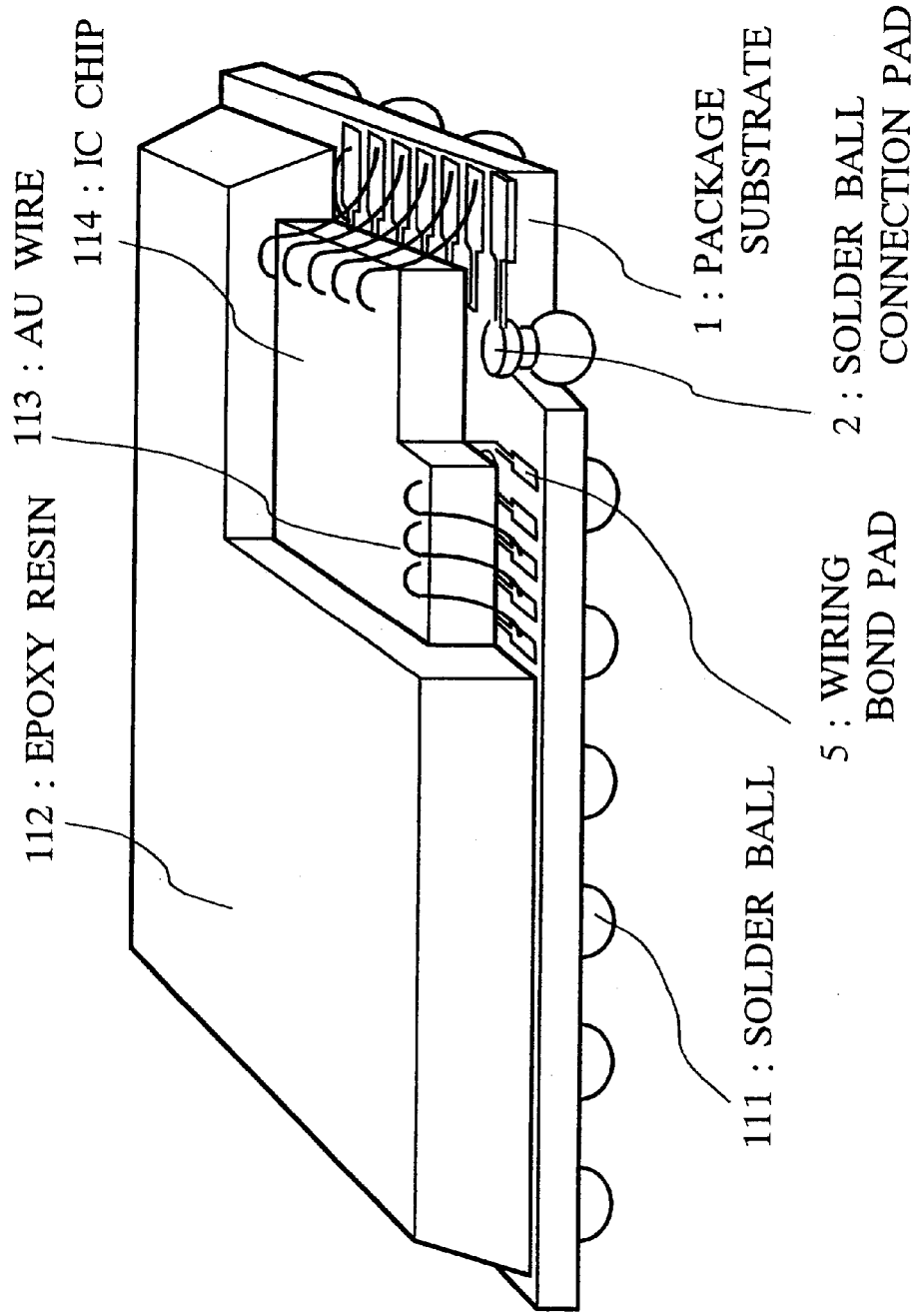
FIG. 2 shows an example of a BGA semi-conductor package taken up as one example of the embodiment of this invention.

FIG. 2 shows an example of a BGA semi-conductor package taken up as one example of this embodiment.

This embodiment explains the circuit wiring system which selects the combination of connecting the plurality of wire bond pads 5 on a package substrate 1 with the plurality of solder ball connection bads 2, and generates wiring candidates which layout wiring routes of combination for the respective connection.

Figure 3:
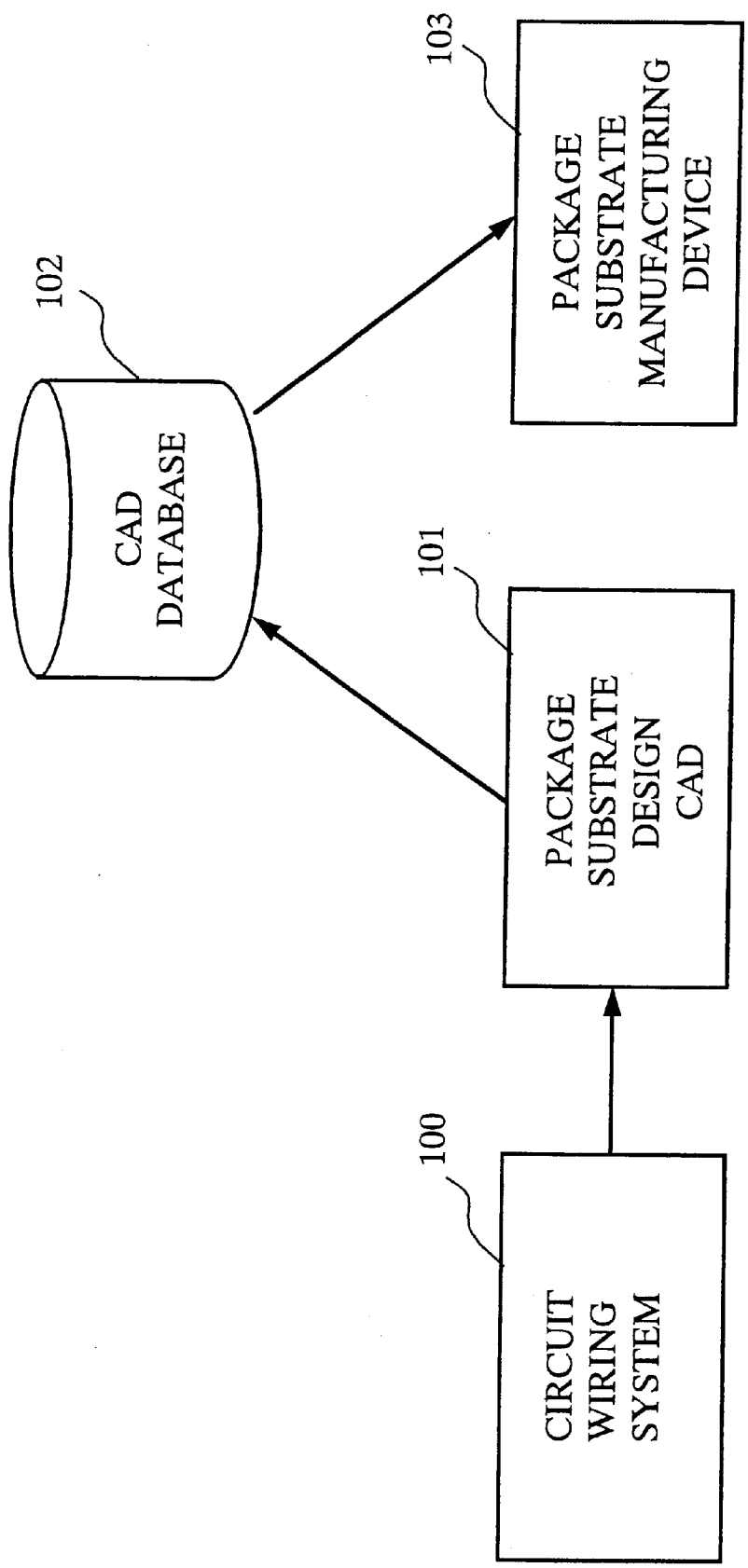
FIG. 3 shows an example of a semi-conductor manufacturing machine incorporated with the circuit wiring system of the invention.

FIG. 3 shows an example of part of semi-conductor manufacturing device incorporated in the circuit wiring system of the present invention.

A wiring candidate created by the above circuit wiring system 100 is transferred to a package substrate design (CAD: Computer Aided Design) 101. At the package substrate design 101, the wiring candidate is processed and stored in a CAD database 102 as a wiring design.

Then, a package substrate 103 obtains the wiring design stored in the CAD database 102, and performs the manufacturing of a package substrate.

First of all, an example of wiring diagram of a package substrate is shown.

Figure 4:
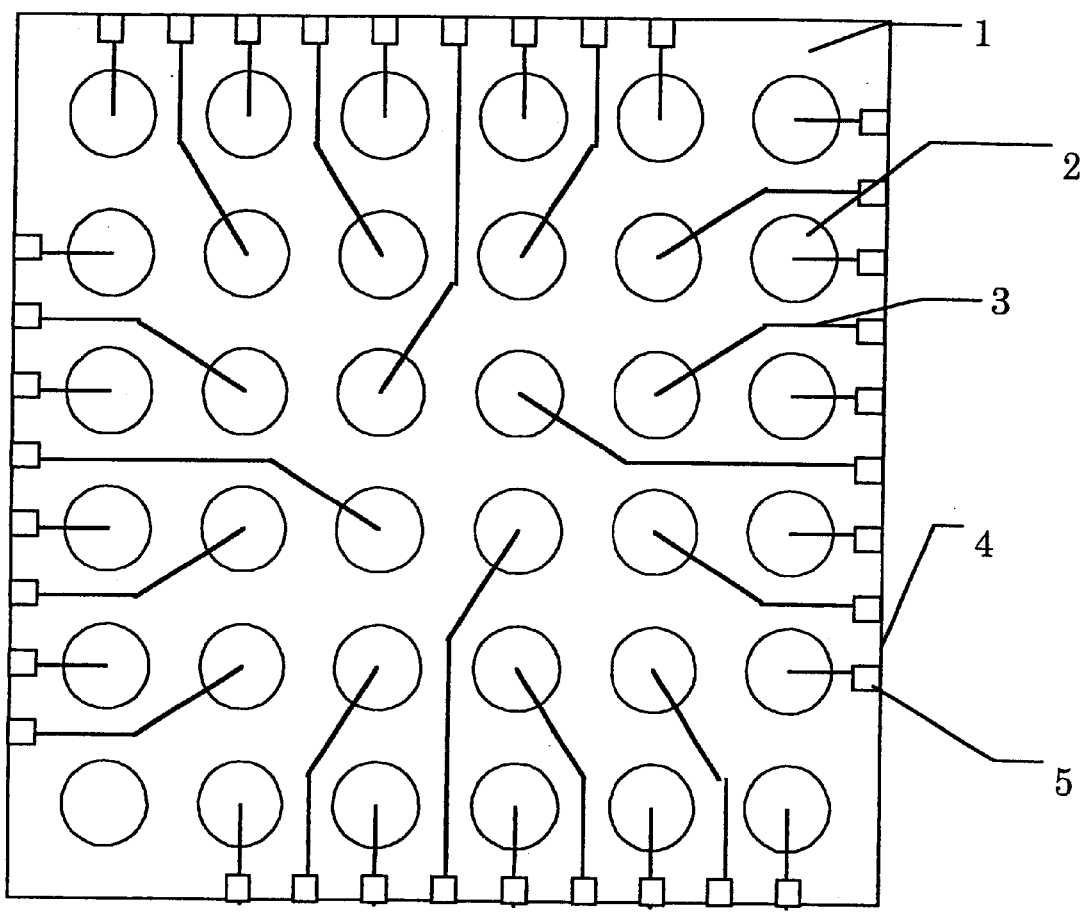
FIG. 4 shows an example of package substrate wiring of the BGA semi-conductor package taken up as one example of the embodiment of this invention.

FIG. 4 is a diagram showing an example of wiring diagram of a package substrate of the BGA semi-conductor package taken up as the example of this embodiment.

1 is the package substrate. And, the package substrate 1 indicates the wiring area to be the area to be layout wiring routes. 2 is a solder ball connection pad. 5 is a wire bond pad. 3 is a wire for connecting the solder ball connection pad 2 and the wire bond pad 5. The circuit wiring system 100 of this invention determines the wiring 3. 4 is an external line of the package substrate 1.

In this embodiment, the wire bond pads 5 are positioned on the outside of the BGA, and the equal number of pads are to be arranged on the four sides of the squarely arrayed BGAs.

Figure 5:
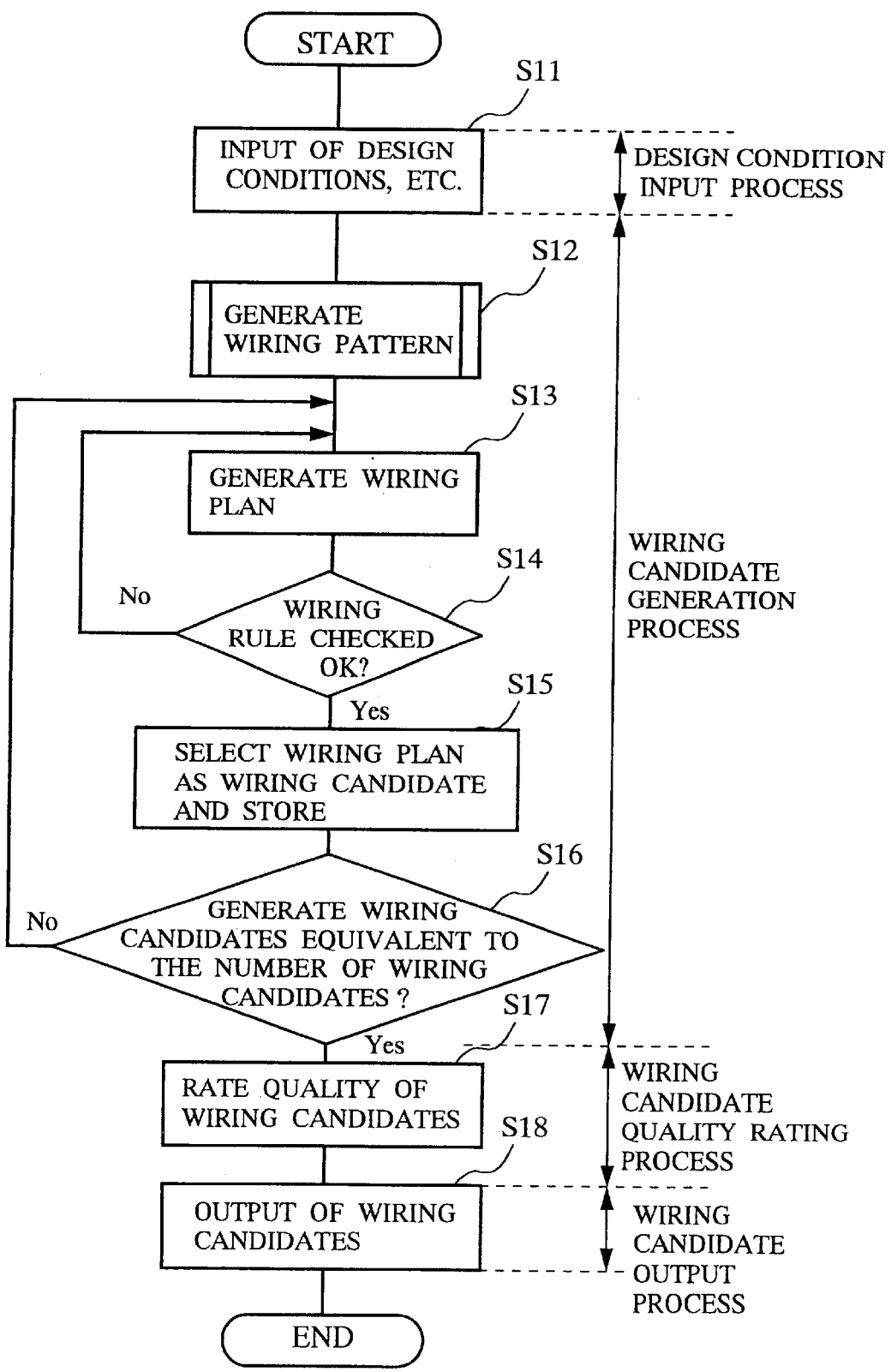
FIG. 5 is a flowchart indicating an operation of the circuit wiring system 100.

Next, the operation of the circuit wiring system shown as one example in FIG. 1 is explained based on FIG. 5.

FIG. 5 is a flowchart showing the operation of the circuit wiring system 100.

Firstly, the operation of design condition input process in which design conditions, etc. are input by a design condition input unit 50 (S11) is explained.

For design conditions, etc., the solder ball connection pad area information, the wire bond pad area information, and the design conditions are included.

The solder ball connection pad area information and the wire bond pad area information are input beforehand, and stored in a design condition memory 41. The information that indicates the coordinates of the solder ball connection pads 2 or wire bond pads 5 is considered as one example, but the detail is not described.

The design conditions are input by the user by way of the design condition input unit 50. The design conditions are stored in the design condition memory 41. Also, the design conditions, a file created by a format complying with a set format, the design condition memory 41 in this embodiment, are prepared, and the file can be used. It is also possible to apply other methods.

FIG. 6 is an example of the design conditions stored in the design condition memory 41.

The design conditions are roughly classified into array conditions and wiring rules.

The array conditions include the information used for laying out the wiring routes. In concrete, the array conditions include the number of vertical rows (N), the number of horizontal rows (M), the number of vertical wires (NF), and the number of horizontal wires (MF). In this embodiment, because a BGA of square shape is assumed, the number of vertical rows (N) and the number of horizontal rows (M) are the same. Moreover, the number of solder ball connection pads 2 of the BGA can be calculated from the number of rows. Furthermore, the array conditions include the number of wiring candidates to be generated.

The wiring rules are explained next.

The array rules determine the limit to designing of the wiring routes.

The wiring rules includes the following elements.

The maximum number for wiring (V) is the maximum number of wirings which can be wired between the adjacent solder ball connection pads 2.

The line width (W) is the width of the wired line.

The wiring space (LS) is the space between the adjacent wires.

The solder ball connection pad 2-wiring space (LB) is the space between the solder ball connection pads 2 and wirings.

Note that the LW, LS, and LB indicate the minimum values.

The above array conditions and the wiring rules are not limited to the above elements. It is possible to include other elements. The values of each element given in FIG. 6 are examples of values for generating wiring candidates shown in FIG. 4.

Then, the operation of wiring candidate generation process in which wiring candidates are generated by the wiring candidate generator 60 (S12 through S15) is expained.

The wiring candidate generator 60 generates wiring candidates based on the first pin area information and the second pin area information and the design conditions including the array conditions and wiring rules stored in the design condition memory 41.

Figure 7:
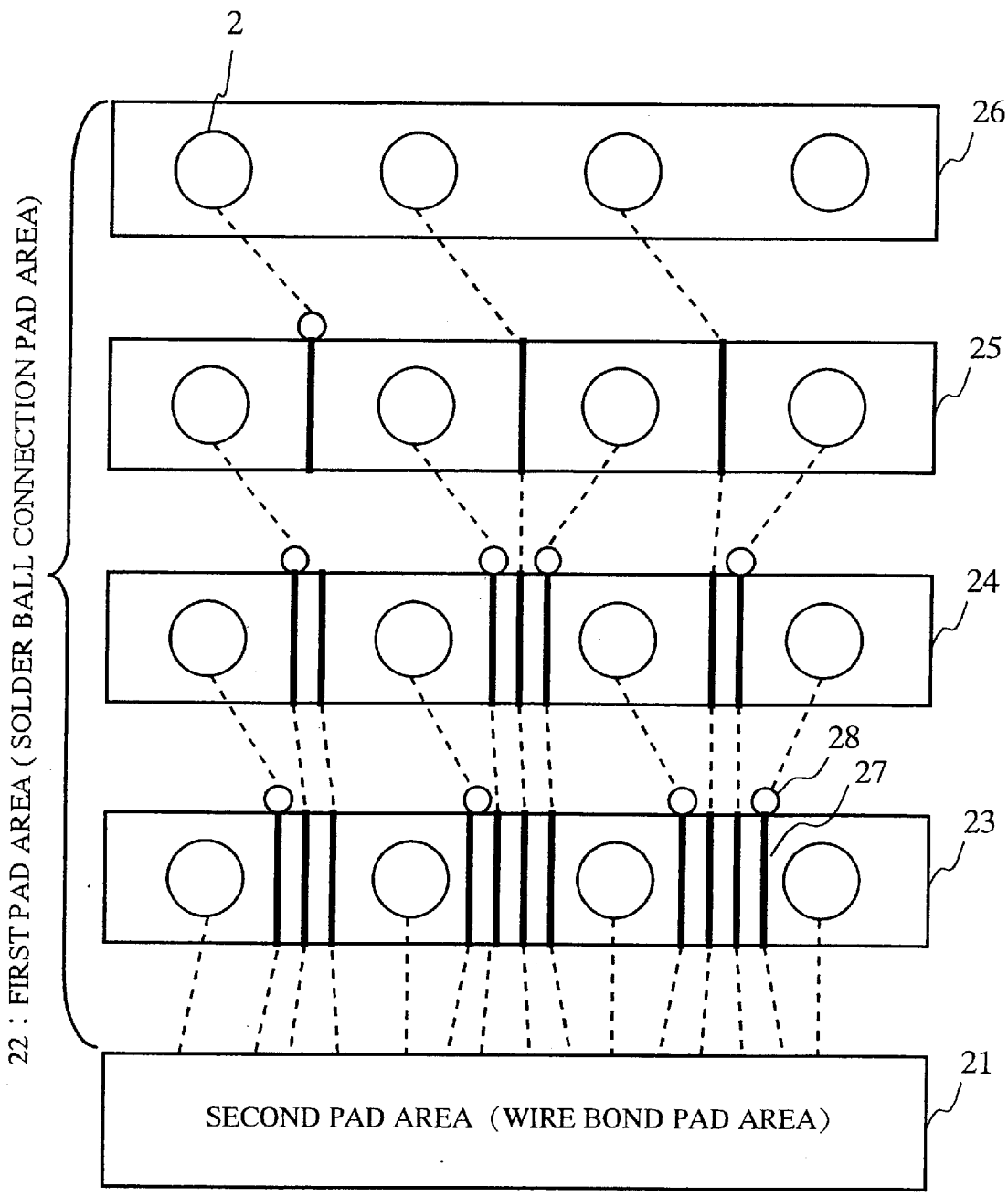
FIG. 7 shows an example of relations between wiring routes and wiring patterns.

How the wiring candidate generator 60 generates wiring candidates is explained here using FIG. 7. FIG. 7 shows an example of relationship between the wiring routes and wiring patterns generated by the wiring candidate generator 60.

21 is a second pin area (the wire bond pad area in this embodiment).

22 is a first pin area (the solder ball connection pad area in this embodiment). As the example, the first pin area of 4×4 (4 by 4) is illustrated.

Furthermore, the first pin area 22 is divided into each row of the plurality of first pins (solder ball connection pads 2), and is assumed to be the divided first pin areas 23 through 26.

For the following explanation of this embodiment, the divided first pin areas 23 to 26 may be treated as rows. Therefore, in FIG. 7, explanation is given as the divided first pin areas 23 to 26, or as rows 23 to 26.

The array candidate generator 60 determines how many wiring routes are set between two adjacent first pins arranged for each row 23 to 26 of the first pin area. Then, a wiring route to be connected to the plurality of first pins arranged for the next row is specified.

The part included in the divided first pin area of the wiring route which passes through the divided first pin area is assumed to be the in-area wiring route. In FIG. 7, it is indicated by 27.

The information of the in-area wiring route which passes through the divided first pin area and the information by which to specify the in-area wiring route connected to the solder ball connection pads 2 (in FIG. 7, ○ indicated by 28) are wiring patterns.

With this circuit wiring system of this embodiment, a plurality of wiring patterns is generated for each row 23 to 26 shown in FIG. 7. One wiring pattern is selected for each row, and the selected wiring patterns are combined. By connecting the in-area wiring routes of the combined wiring patterns, the plurality of wiring routes are laid out and wiring candidates are generated. In this way, the wiring candidates are generated.

In FIG. 7, the connection of in-area wiring routes of the wiring patterns of each row is indicated by dotted lines.

Also, the number of wirings (the number of connections of the plurality of first pins and the plurality of second pins) to be laid out in the first pin area 22 is regarded as number of connections.

The number of in-area wiring routes to be wired for each row becomes the number of unconnected lines, which is not yet connected, among the number of connections. The number of unconnected lines is the number subtracting the number of the first pins arranged from a row including the row to the row close to the second pin area from the above-mentioned number of connections. However, among the plurality of first pins, if there are first pins not targeted to be connected to the plurality of second pins, the number of the first pins must be removed from the number of the first pins arranged for each row.

For the following explanation, an expression of dividing into near area which is closer to, and the far area which is far from the second pin area may be used. To be concrete, if the first pin area 22 is divided by row 23 and by rows 24 to 26, row 23 becomes the near area and rows 24 to 26 become the far area. Moreover, if the far area made up of rows 24 to 26 is divided into a near area and far area, then it is regarded as dividing into row 24 and rows 25 to 26. In this way, wiring patterns can be generated sequentially from the area closer to the second pin area. Naturally, there is a case in which the plurality of rows is included in the near area. Note that in FIG. 7, although the solder ball connection pads are arranged linearly on one line, it is not limitive. For example, other than straight lines such as jigsag or wave forms can be applied.

Hereinbelow, an expression the wiring pattern generation unit 61 uses for arranging in-area wiring routes is explained.

The wiring pattern generation unit 61 generates a wiring pattern for each solder ball connection pad areas 23 to 26 into which the solder ball connection pad area 22 is divided. The divided solder ball connection pad areas 23 to 26 are made up of one row having the arrayed plurality of solder ball connection pads 2.

The in-area wiring routes of the wiring pattern determines the number of wirings of the in-area wiring routes to be laid out between two adjacent solder ball connection pads 2 arranged on one line.

The expression for wiring maximum 3 lines between two solder ball connection pads are given below.

$$3*i+2*j+1*k=n \quad \text{(expression 1-1)}$$

$$1*j+2*k=3*(N-1)-n \quad \text{(expression 1-2)}$$

where, the variables denote the following values:
- i: the number of locations where 3 wires are set between two solder ball connection bads
- j: the number of locations where 2 wires are set between two solder ball connection pads
- k: the number of locations where one wire is set between two solder ball connection bads
- n: the number of wires between two solder ball connection pads
- N: the number of solder ball connection pads The above two expressions cannot calculate one solution. Thus, j and k at the time of i are solved, and then j and k for each possible value i are solved to calculate a plurality of solutions. The calculated plurality of solutions are to determine the in-area wiring routes of the wiring patterns.

The following are the expressions for solving j and k for one possible i.

$$0<=i<=n/3 \quad \text{(expression 1-3)}$$

$$k=i-n+2*(N-1) \quad \text{(expression 1-4)}$$

$$j=3*(N-1)-n-2*k \quad \text{(expression 1-5)}$$

For the case of 2 or 4 wires, the in-area wiring routes are laid out similarly to the above case of 3 wires using the expression shown below.

The expression for a case of wiring maximum 2 wires between the solder ball connection pads is shown below.

$$2*j+1*k=n \quad \text{(expression 2-1)}$$

k is to be solved.

$$k=n-2*j \quad \text{(expression 2-2)}$$

The expressions for wiring maximum 4 wires between two solder ball connection pads are given below.

$$4*h+3*i+2*j+1*k=n \quad \text{(expression 3-1)}$$

$$i+2*j+3*k=4*(N-1)-n \quad \text{(expression 3-2)}$$

where, $$4*(N-1)-n=m \quad \text{(expression 3-3)}$$

h: the number of locations for wiring 4 wires between two solder ball connection pads i and j are to be solved.

$$i=(n-m+2*k-4*h)/2 \quad \text{(expression 3-4)}$$

$$j=(m-i-3)*k \quad \text{(expression 3-5)}$$

$$1<=h<=n/4 \quad \text{(expression 3-6)}$$

$$0<=k<=(N-h) \quad \text{(expression 3-7)}$$

For instance, when maximum 3 lines are wired between two solder ball connection pads, (expression 1-1) and (expression 1-2) can be used. Also, when maximum 2 lines are wired between the solder ball connection pads, (expression 2-1) can be used. Moreover, when maximum 4 lines are wired between the solder bad connection pads, (expression 3-1) (expression 3-2) and (expression 3-3) can be used.

Based on the above concept, the process of laying out wiring routes is shown with a trial expression in FIGS. 9 to 13. In FIGS. 9 to 13, part of the BGA substrate is illustrated as one example.

Figure 9:
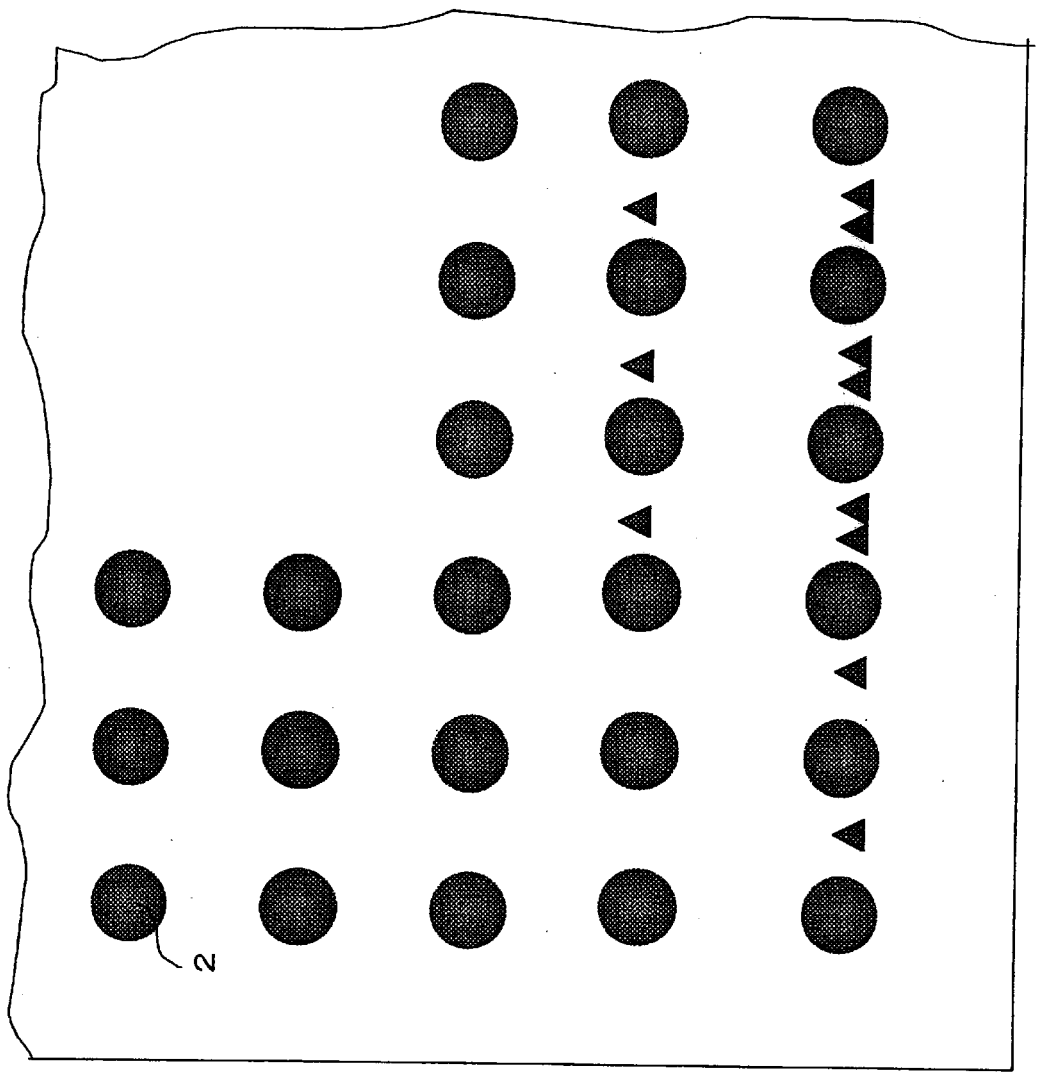
FIG. 9 shows a process of laying out (generation of wiring patterns) of the wiring routes.

FIG. 9 shows a condition in which in-area wiring routes between the solder ball connection pads 2 are determined and a wiring pattern is generated.

Figure 10:
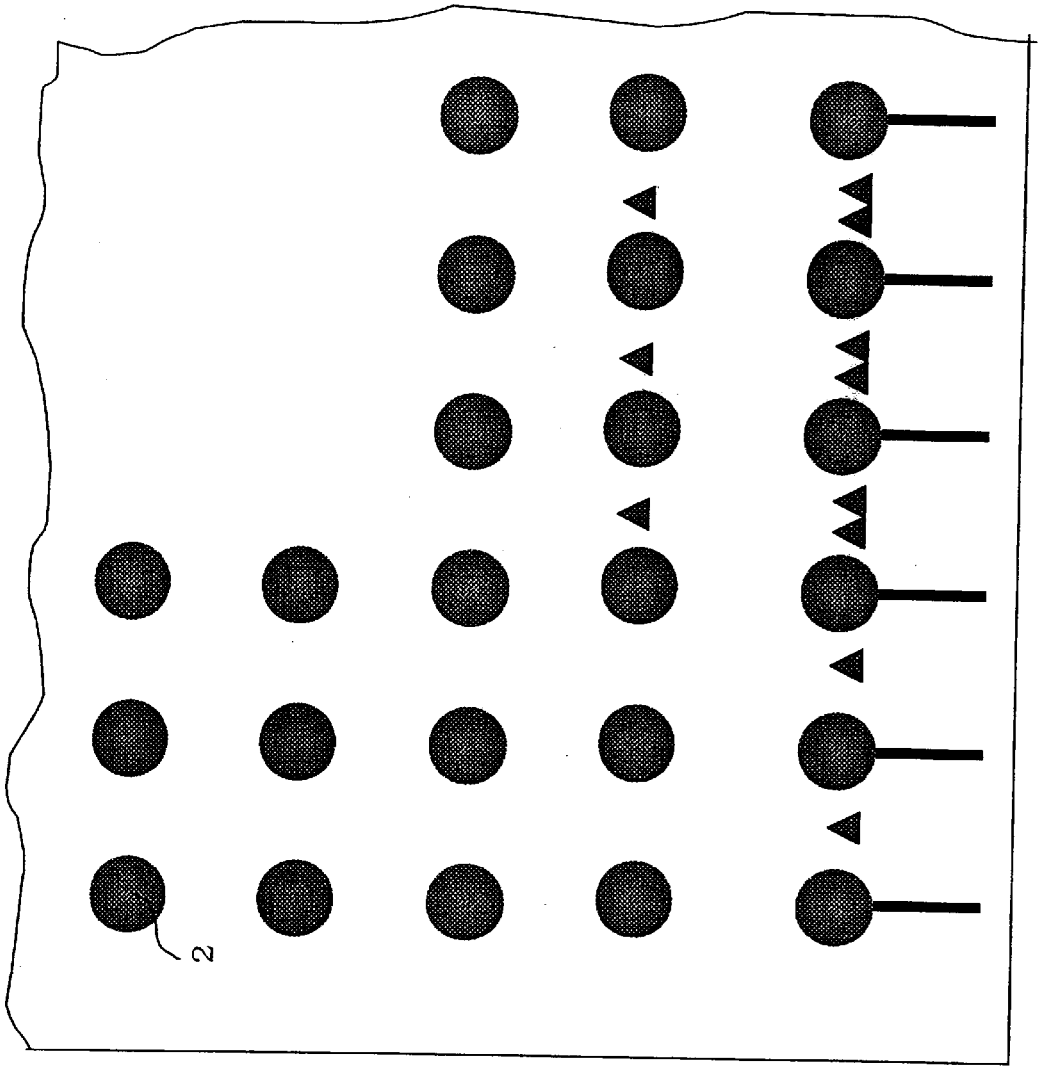
FIG. 10 shows a process of laying out (layout of a first wiring route) of the wiring routes.

FIG. 10 shows a condition in which the wiring routes of the solder ball connection pad area closest to the wire bond pad area are laid out.

Figure 11:
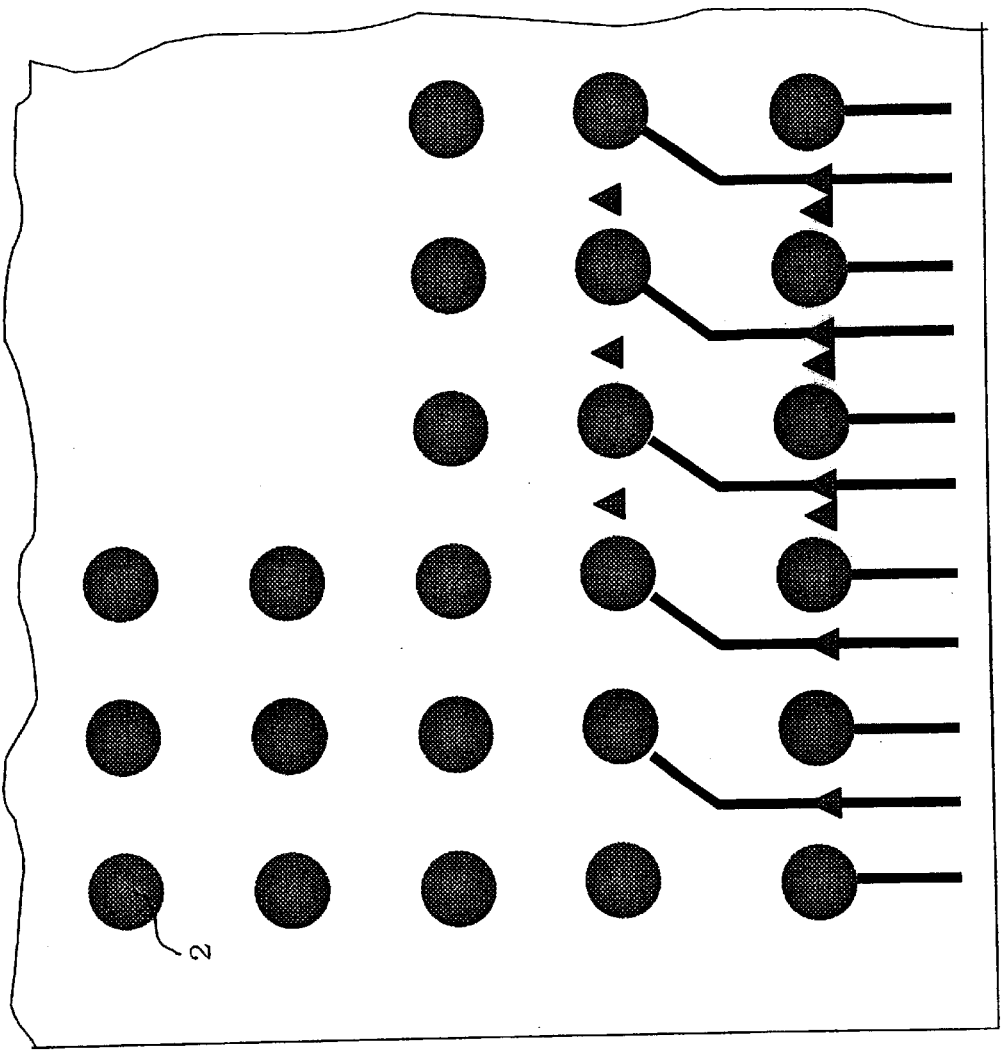
FIG. 11 shows a process of laying out (layout of a second wiring route) of the wiring routes.

FIG. 11 shows a condition in which the wiring routes of the solder ball connection pad area the second closest to the wire bond pad area are laid out.

Figure 12:
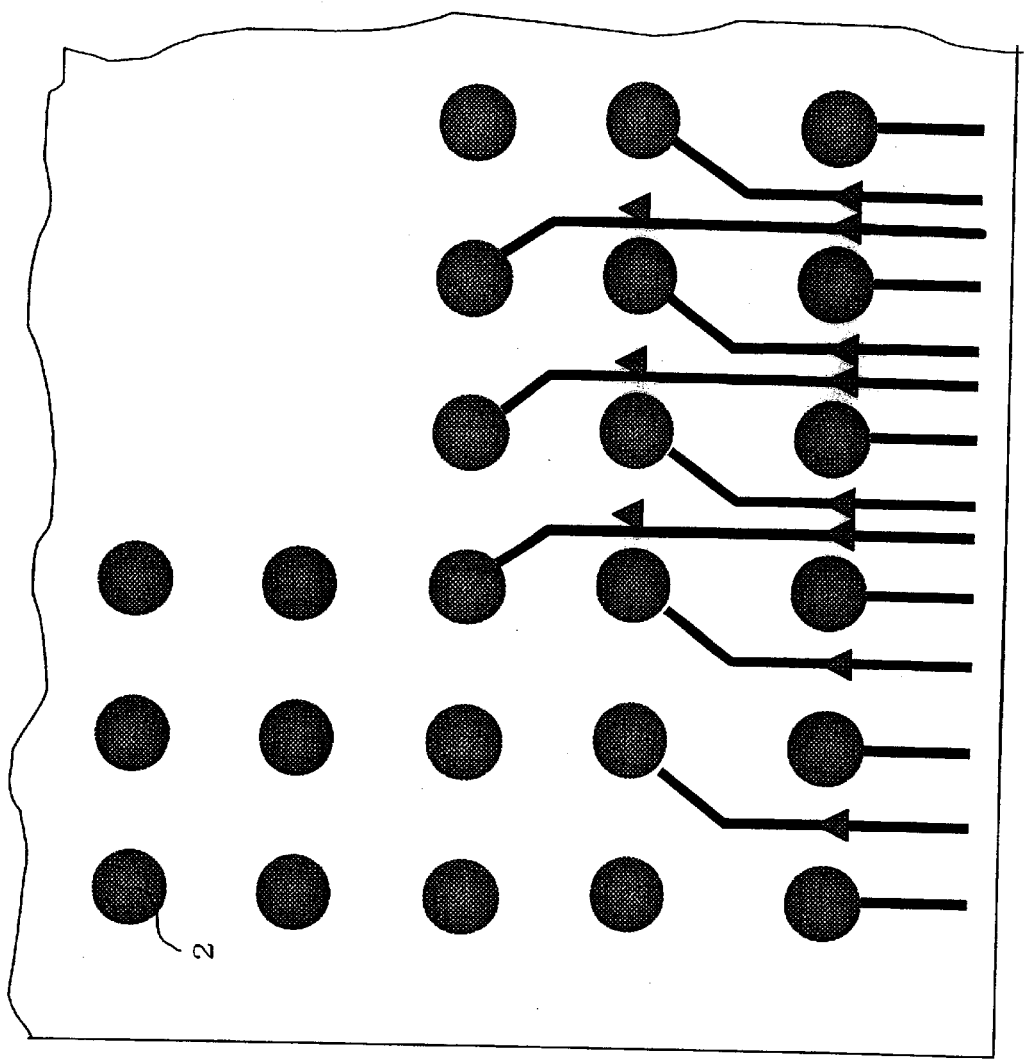
FIG. 12 shows a process of laying out (layout of a third wiring route) of the wiring routes.

FIG. 12 shows a condition in which the wiring routes of the solder ball connection pad area the third closest to the wire bond pad area are laid out.

Figure 13:
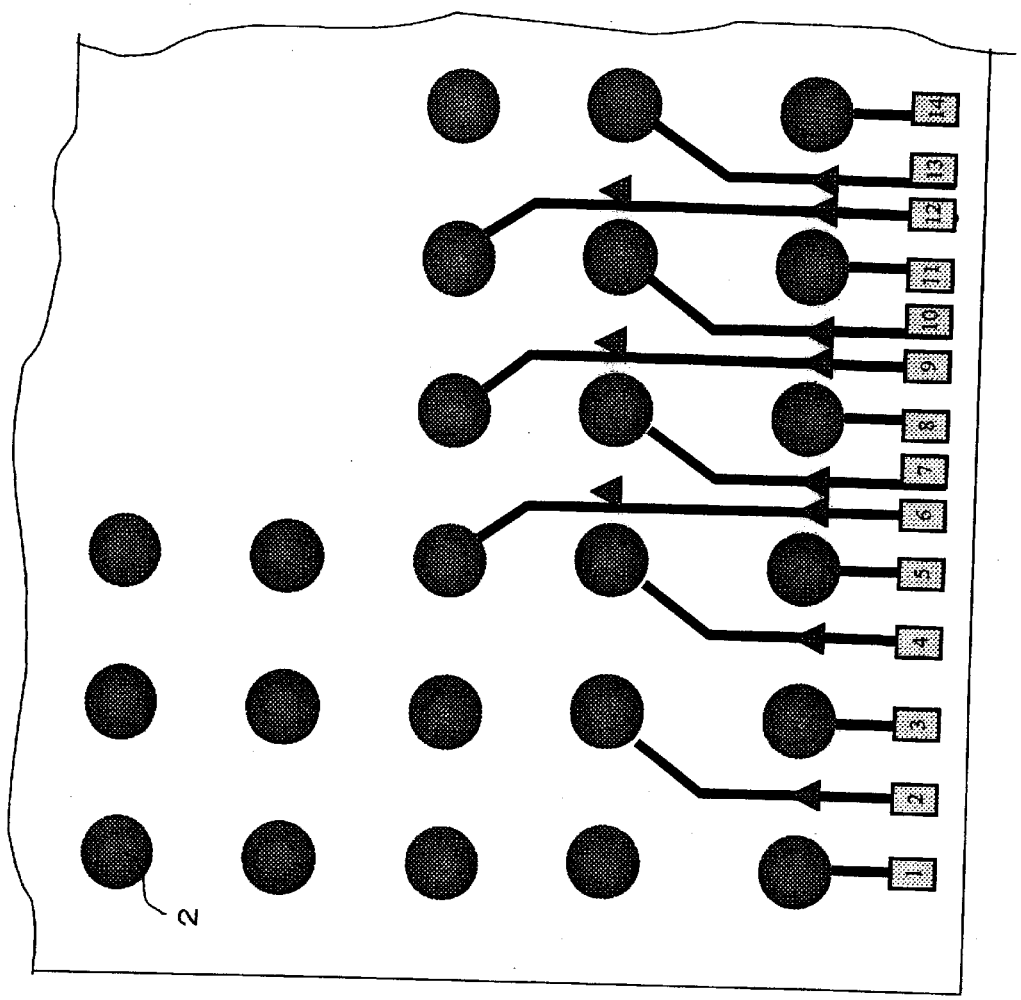
FIG. 13 shows a process of laying out (arrangement of wire bond pads 5) of the wiring routes.

FIG. 13 shows a condition in which the wire bond pads 5 are arranged and connected.

The wiring routes are laid out as explained above.

Figure 8:
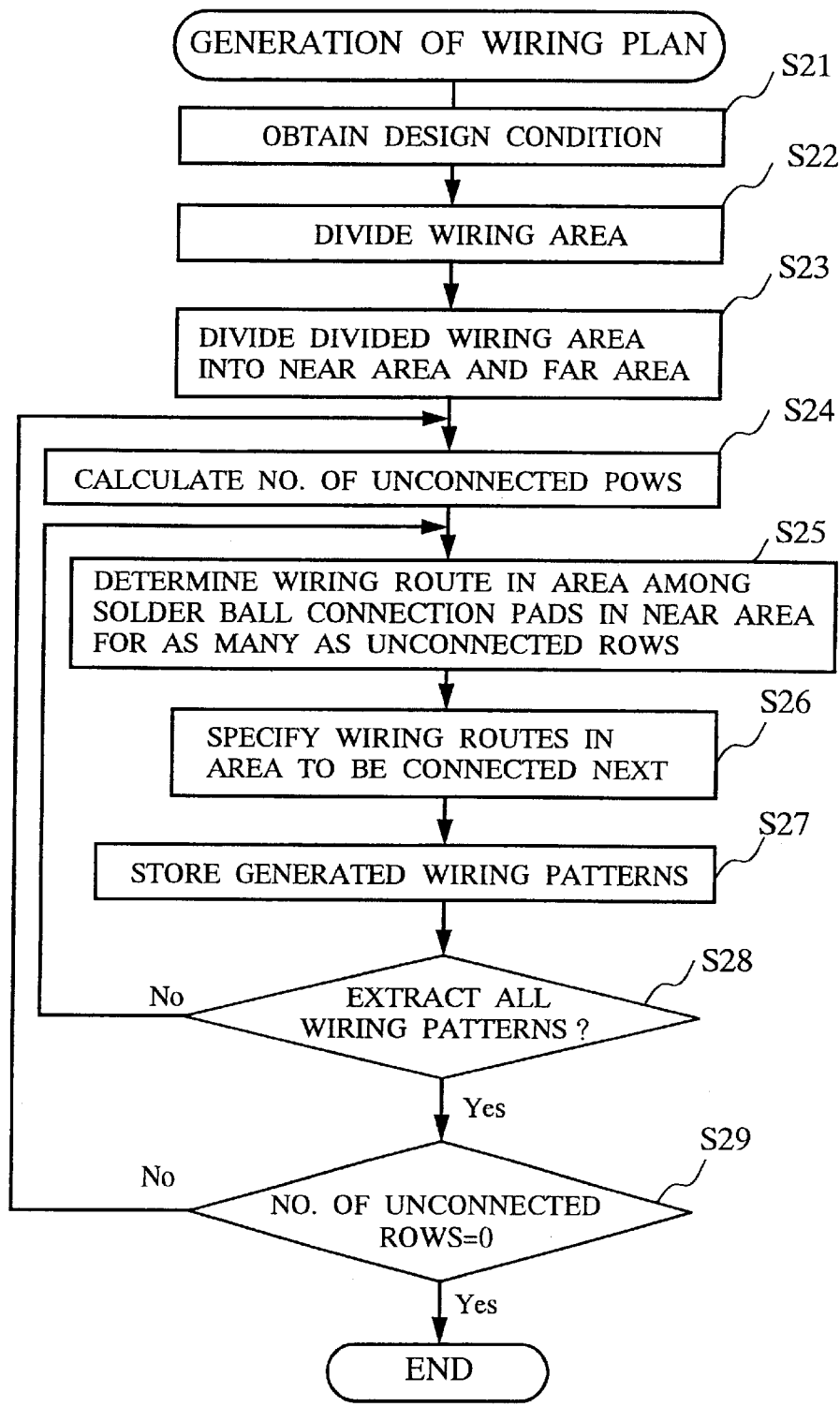
FIG. 8 is a flowchart indicating an operation of a wiring pattern generation unit.

With referring to FIGS. 7 to 8, how the circuit wiring system explained above is processed is explained.

The wiring candidate generator 60 implements the above processing through the configurations of 61 to 63 shown in FIG. 1.

61 is the wiring pattern generation unit which generates a plurality of wiring patterns for each of the divided first pin areas, the layout information of the plurality of in-area wiring routes for the number of unconnected lines for each of the divided first pin areas, and information which specifies the plurality of in-area wiring routes to be connected to the plurality of first pins.

62 is the wiring plan generation unit which selects each of the plurality of wiring patterns in each of the divided first pin areas, and generates a plurality of wiring plans by laying out the plurality of wiring routes by connecting the each of the plurality of wiring patterns selected from each of the divided first pin areas.

63 is a wiring rule check unit which selects a wiring plan satisfying the wiring rules stored in the design condition memory 41, as the wiring candidate.

The operation of creating the wiring plan (S12) by the wiring pattern generation unit 61 is explained next referring to FIG. 8.

The wiring pattern generation unit 61 obtains (S21) the design conditions from the design condition memory 41. The design conditions include the array conditions and the maximum number for wiring included in the wiring rules.

The wiring pattern generation unit 61 divides (S22) the wiring area next.

For the BGA semi-conductor package substrate taken up as one example of this embodiment, the number of vertical rows (N) is equal to the number of horizontal rows (M), and the number of wires are also equal for vertically and horizontally. Therefore, the efficiency is improved as the wiring area laying out the wiring routes is divided and the wiring routes are laid out for part of the divided wiring area, and the laid out wiring routes are copied for other divided wiring areas.

The division of the wiring areas is explained next.

Figure 14:
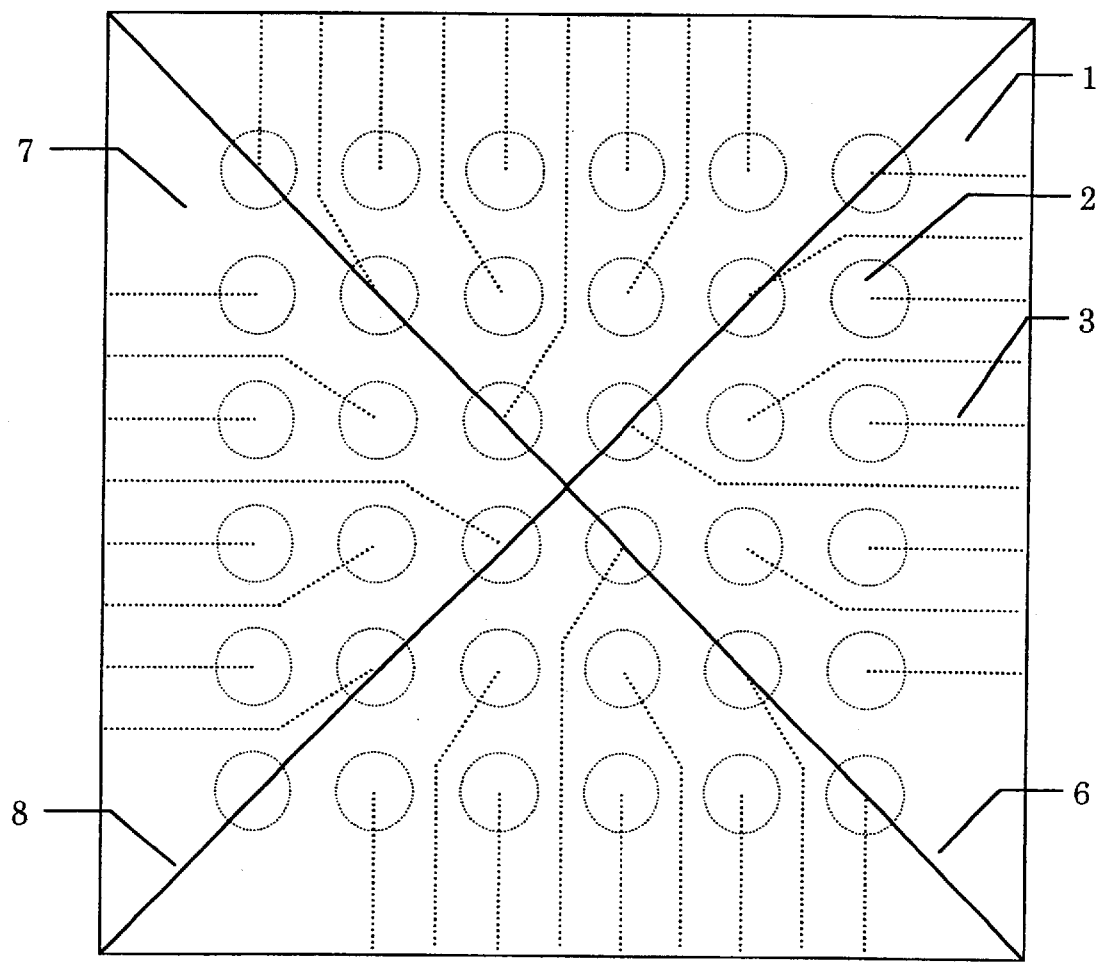
FIG. 14 shows one example of dividing a wiring area.

FIG. 14 shows one example of divided wiring area of the BGA semi-conductor package substrate which is the same as that of FIG. 4.

The wiring area is divided into four parts by division lines 6 and 8, the diagonal lines. And because the number of vertical wires (NF) and the number of horizontal wires (MF) are the same as indicated in FIG. 6, the wire bond pads 5 are divided equally for the divided wiring areas. The divided wire bond pads 5 are to be connected to the solder ball connection pads 2 in the divided wiring areas. The solder ball connection pads 2 on the division lines 6 and 8 are included in one of the divided wiring areas so that they are divided equally for the divided wiring areas, and thus four evenly divided wiring areas are created.

The wiring pattern generation unit 61 generates (S23 to S30) wiring patterns of the wiring areas as divided above.

In this embodiment, because the four divided wiring areas are equal, the wiring pattern generation unit 61 generates a wiring pattern for one of the divided wiring areas.

The wiring pattern generation unit 61 also generates the wiring patterns based on the separation of the areas controlling the wiring density or the wiring pattern generation rules such as the number of wirings between the adjacent solder ball connection pads 2. Given below is one example of wiring pattern generation rule. The separation of areas controlling the wiring density and the number of wirings between the adjacent solder ball connection pads 2 are explained.

Figure 15:
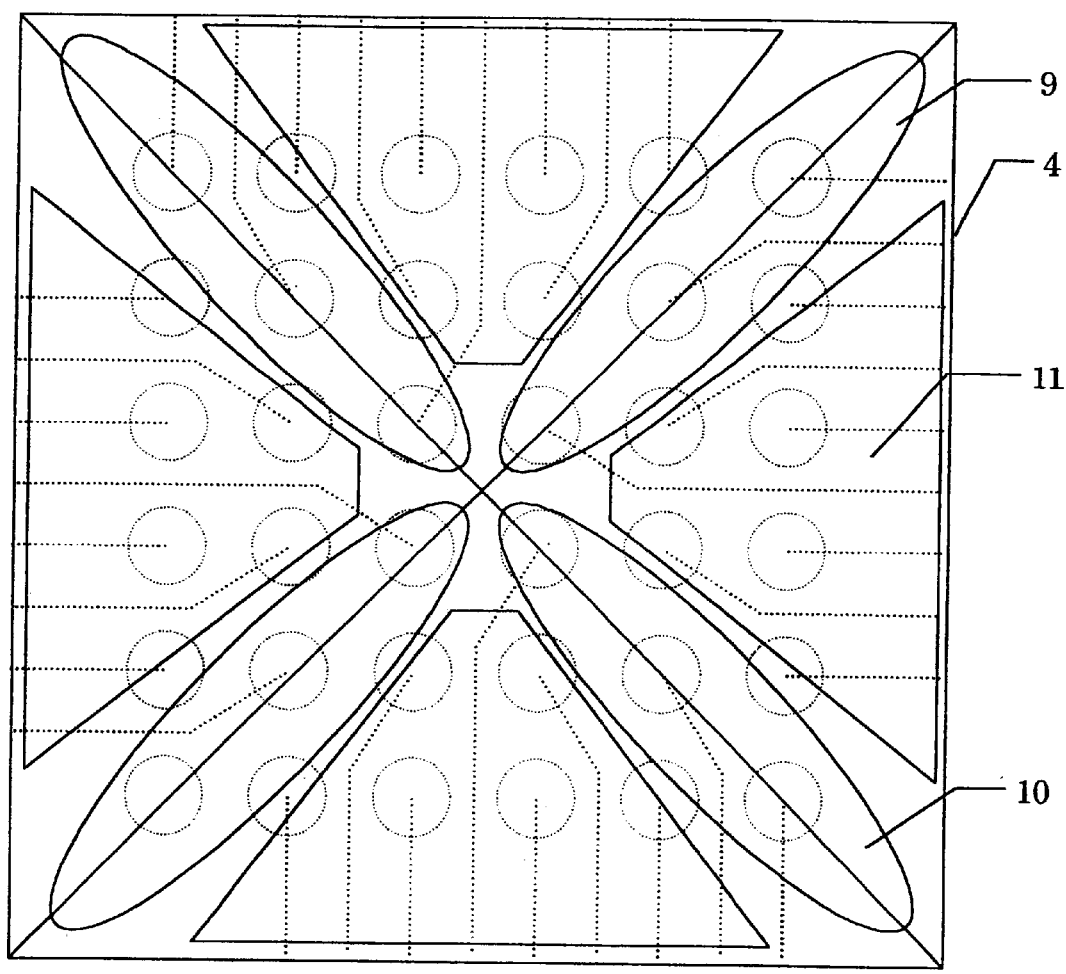
FIG. 15 shows one example of partitioning an area controlling a wiring density.

FIG. 15 is a diagram showing one example of separating the area which controls the wiring density.

Areas indicated by 9 and 10 are the areas which include the solder ball connection pads 2 arranged on the diagonal lines in the wiring areas. A plurality of wirings is not arranged between the adjacent solder ball connection pads 2 included in the areas 9 and 10. While a plurality of wirings is possible between the adjacent solder ball connection pads 2 included in the area 11.

Wiring routes are likely to concentrate on the areas 9 and 10. Therefore, by controlling the density of wiring routes by the area, the wiring routes that are difficult to violate the wiring rules can be generated.

Furthermore, among the solder ball connection pads 2 on the same row arranged in the area 11, the number of wirings between two adjacent solder ball connection pads 2 arranged in the central part is set greater than the number of wirings between two adjacent solder ball connection pads 2 arranged in the outer part. For example, when the maximum number for wiring is 3, the number of wirings between two adjacent solder ball connection pads 2 in the central part is set to 3, and the number of wirings between two adjacent solder ball connection pads 2 arranged in the outer part is set 2. The rules are realized by using a computing machine described later.

Note that the wire bond pads 5 are not illustrated in FIG. 14 and FIG. 15. The wire bond pads 5 are to be arranged in the appropriate locations after the wiring candidates are determined.

The details of the arrangement method of the wire bond pads 5 are not explained here. Just make sure that the wire bond pads 5 are arranged equally.

The number of wirings between the adjacent solder ball connection pads 2 is explained next.

This is related to the decision of the in-area wiring routes between the pins in the divided first pin areas 23 to 26 explained with FIG. 7.

The wiring pattern generation unit 61 further divides the divided wiring areas, and generates the wiring patterns targeting the area in which the plurality of solder ball connection pads 2 is arranged on one row. An example of a row which becomes a unit for generating wiring patterns is given below.

Figure 16:
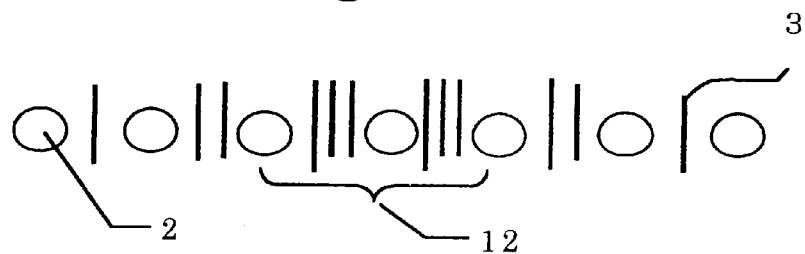
FIG. 16 shows a wiring example when the maximum number of wirings between adjacent solder ball connection pads 2 is set to be 3.

FIG. 16 shows an example of wiring when the number of wirings between the adjacent solder ball connection pads 2 is 3.

A part indicated by 12 exemplifies the part where the number of wirings between two solder ball connection pads 2 is set to be 3.

Figure 17:
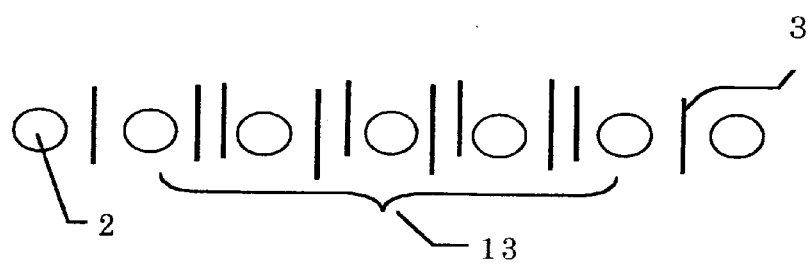
FIG. 17 shows a wiring example when the maximum number of wirings between the adjacent solder ball connection pads 2 is set to be 2.

FIG. 17 exemplifies a wiring diagram when the number of wirings between two adjacent solder ball connection pads 2 is set to be maximum 2.

A part indicated by 13 exemplifies the part where the number of wirings between two solder ball connection pads 2 is 3.

Figure 18:
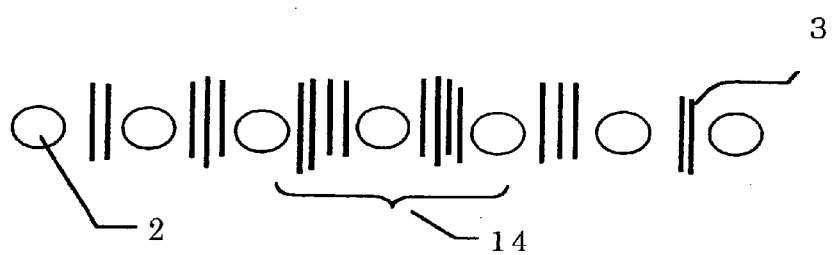
FIG. 18 shows a wiring example when the maximum number of wirings between the adjacent solder ball connection pads 2 is set to be 4.

FIG. 18 exemplifies when the number of wirings between two adjacent solder ball connection pads 2 is set to be maximum 4.

A part indicated by 14 exemplifies the part where the number of wirings between two solder ball connection pads 2 is 4.

The part indicated by 12 exemplifies the wirings for checking a case when the maximum number for wiring of the wiring rules is set to be 3.

A part indicated by 15 is the example of acceptable wiring, and 16 is the example of not acceptable wiring. The check is implemented by the wiring rule check unit 63 which is described later.

The wiring pattern generation unit 61 generates the wiring patterns for the divided wiring areas based on the above wiring pattern generation rules. The wiring pattern generation unit 61 is going to generate wiring patterns sequentially from the array of the plurality of solder ball connection pads 2 arranged in the area closer to the area where the plurality of wire bond pads 5 is arranged.

The details of the operation of generating wiring patterns by the wiring pattern generation unit 61 for the arrays of the solder ball connection pads 2 on the package substrate shown in FIG. 4 is explained (FIG. 8, S23 to S29).

The wiring pattern generation unit 61 handles the solder ball connection pads 2 arranged in the divided wiring areas as a set of rows in which the solder ball connection pads 2 are arranged on one row, as shown in FIG. 7. Among the divided wiring areas, the row (the divided solder ball connection pad area) of solder ball connection pads 2 close to the area in which the wire bond pads 5 are arranged is regarded as a first row, and then a second row, a third row, sequentially for the explanation. The number of wire bond pads 5 arranged in the divided wiring areas is the number of wiring routes to be connected to the solder ball connection pads 2 existing in the divided wiring areas. Therefore, the number of connections here is assumed to be the number of wire bond pads 5 arranged in the divided wiring areas.

Firstly, the wiring pattern generation unit 61 divides the divided wiring areas further into the near area and far area (S23).

Then, the wiring pattern generation unit 61 calculates the number of unconnected lines among the wiring routes to be connected (S24). The number of solder ball connection pads 2 arranged in near area is subtracted from the number of connections. The calculated number is the number of unconnected lines.

The wiring pattern generation unit 61 determines the in-area wiring routes to be arranged between the solder ball connection pads 2 for the number of unconnected lines (S25). The arrangement of concrete in-area wiring routes is performed using an expression.

Then, the in-area wiring routes to be connected are specified (S26). The specified number is the number of the first pins to be connected arranged on the next row. When there is a plurality of in-area wiring routes between two solder ball connection pads 2, the in-area wiring route closer to either of the solder ball connection pads 2 arranged on both sides is specified to be connected firstly.

Then the wiring pattern generation unit 61 stores in the wiring pattern memory 43 as the generated wiring patterns (S27).

Then, whether or not all wiring patterns have been extracted is judged (S28). This judgement can be made, using the equation for computing the number of wirings between the solder ball connection pads 2, by seeing whether all the computable cases have been extracted.

The wiring pattern generation unit 61 repeats S25 through S27 until the judgement is made that all the wiring patterns have been extracted at S28. In this way, the wiring pattern generation unit 61 generates a plurality of wiring patterns for one row.

Then the wiring pattern generation unit 61 repeats the processing from S24 to S28 in order to generate the wiring patterns for the next row.

In this way, the wiring pattern generation unit 61 repeats the above processing (S29) until the number of unconnected lines becomes 0 (nought).

In this way, the in-area wiring routes are determined.

This is the details of the operation of generating wiring patterns by the wiring pattern generation unit 61.

Then, the operation of creating wiring plans by the wiring plan generation unit 62 using the wiring patterns generated by the wiring pattern generation unit 61 is explained (FIG. 5, S13).

Among the plurality of wiring patterns generated for each row, one is selected for each row. The selection is made arbitrarily or at random using a random number. By combining one selected wiring pattern for each row, the wiring routes for connecting the solder ball connection pads 2 in the divided wiring areas and the wire bond pads are laid out. When the wiring patterns or the divided wiring areas have been generated, the wiring plan generation unit 62 further generates a wiring plan which indicates the wiring routes for the entire wiring area by copying the wiring routes of the divided wiring areas.

Here, as explained above, the created wiring plan is selected at random from a plurality of wiring patterns for each row. Because of this, it is not always true that a combination of wiring patterns which layouts an optimum wiring route has been created. However, the optimization of wiring routes can be achieved because the wiring patterns are created based on the certain wiring pattern generation rules, as described before, at the step of generating wiring patterns, and furthermore, the quality of wiring candidates is rated by a quality rating unit 70, which will be described later on. In addition, the above problem is solved because the wiring candidate is selected based on the rated result of the quality rating unit 70, among the plurality of wiring candidates.

Moreover, the plurality of wiring routes to be laid out in the divided wiring areas can be generated as many as the number of combinations of the plurality of wiring patterns of each row. In this embodiment, as shown in the flowchart of FIG. 5, the wiring routes are generated until the wiring plan checked OK (S14) by the wiring rule check unit 63, which will be described later, becomes the number equivalent to the number of wiring candidates (S16).

Then, the wiring rule check unit 63 checks (FIG. 5, S14) the wiring plans created by the wiring plan generation unit 62 based on the wiring rules (design rules).

The wiring rule check unit 63 reads the wiring rules stored in the design condition memory 41. It determines whether the wiring plans satisfy the wiring rules that have just been read.

The wiring rules are, as exemplified in FIG. 6, the maximum number for wiring between two adjacent solder ball connection pads 2, line width, line space, and solder ball connection pads 2—wiring space, and so on. However, these are only examples, and not limited to the above items. It is also possible to set part of the above items as the check item. It is sufficient to select check itmes which satisfy the design conditions.

Figure 20:
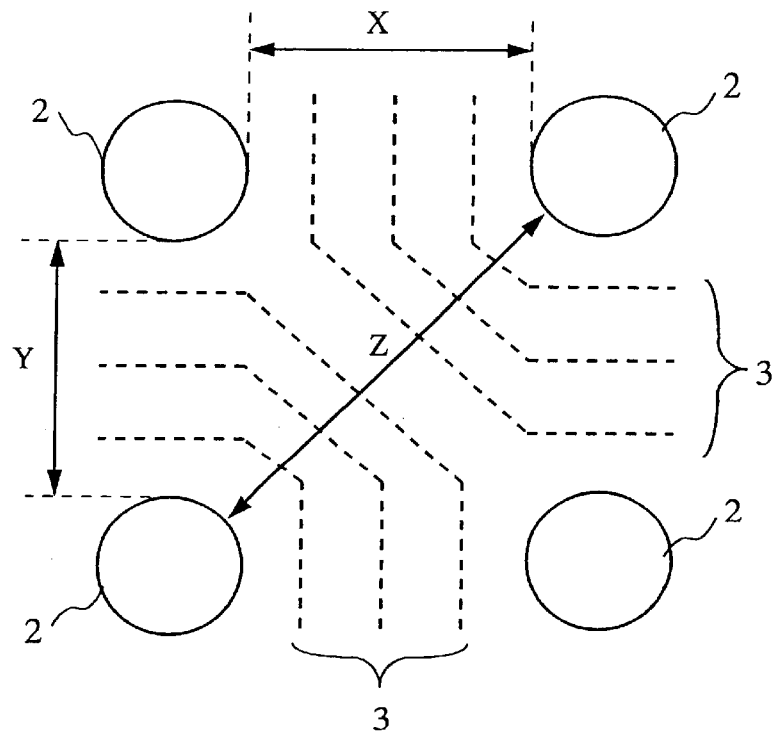
FIG. 20 explains the maximum number for wiring between the solder ball connection pads 2.

FIG. 20 explains the maximum number for wiring between two adjacent solder ball connection pads 2.

X indicates the maximum number for wiring between two horizontally adjacent solder ball connection pads 2.

Y indicates the maximum number for wiring between two vertically adjacent solder ball connection pads 2.

Z indicates the maximum number for wiring between two adjacent solder ball connection pads 2 on the opposite rows.

Figure 19:
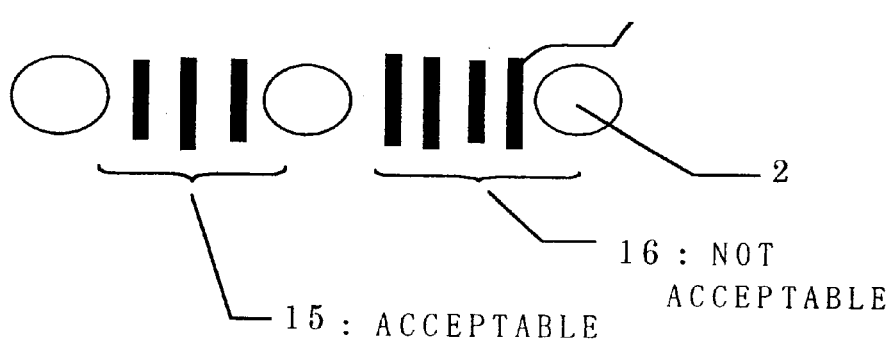
FIG. 19 shows an example of wiring pattern when checking a case in which the maximum number for wiring of wiring rule is set to be wiring 3.

The wiring plan generation unit 62 checks whether the number of wirings on the above X, Y, and Z does not exceed the maximum number for wiring (V) of the wiring rules. For the judgement of acceptable or not acceptable, FIG. 19 shows an example of a case when the maximum number for wiring is 3.

Also, FIG. 20 gives an example appropriate for a case when the maximum number for wiring is 3.

Figure 21:
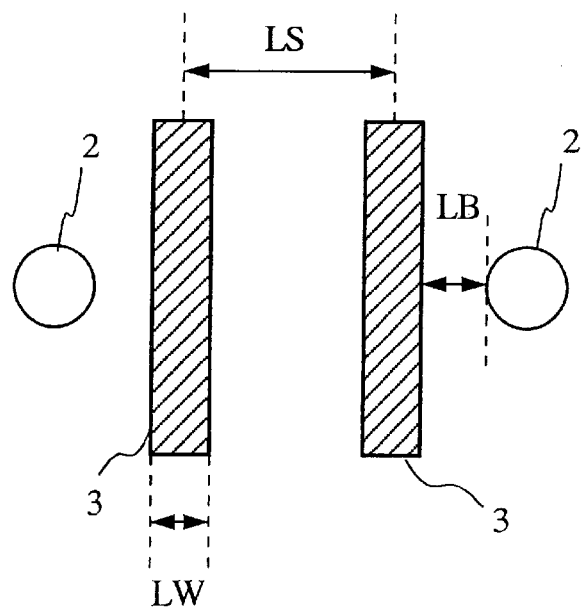
FIG. 21 explains line width, wiring spacing, and solder ball connection pads2-wiring space.

FIG. 21 explains the line width, wiring space, solder ball connection pads 2-wiring space.

In the figure, LW stands for the line width, LS stands for the wiring space, and LB stands for the solder ball connection pads 2-wiring space. The wiring rule check unit 63 checks the above LW, LS, and LB.

The wiring rule check unit 63 selects (S14) the wiring plan that satisfies the wiring rules.

The selected wiring plan is stored (S15) in the wiring candidate memory 44 as a wiring candidate.

The wiring plan determined not satisfying the wiring rules by the wiring rule check unit 63 is discarded (S14). The processing is performed again from the step of wiring plan generation (S13).

As described above, the wiring candidate generator 60 repeats S12 through S15 until the wiring candidates equivalent to the number of wiring candidates are created. Because the number of wiring candidates for this embodiment is 1, the step is repeated until one wiring candidate is created.

The operation of wiring candidate quality rating steps which rates the generated wiring candidates by the quality rating unit 70 is explained (S17).

The quality rating unit 70 rates the generated plurality of wiring candidates (S17). The quality rating unit 70 reads the plurality of wiring candidates stored in the wiring candidate memory 44.

Then, the quality rating unit 70 reads the quality standard from a quality standard memory 42. The quality standard is divided into electrical restrictions and mechanical restrictions.

The electrical restrictions are as follows:
(1) the wiring space,
(2) the bending angle of wiring,
(3) the length of the straight part wiring,
(4) the parallel length of the plurality of wirings, and so on.

The mechanical restrictions are as follows:
(1) line width,
(2) wiring space
(3) the number of wirings between the adjacent solder ball connection pads 2, and so on.

Furthermore, it is possible to add elements such as cost or easiness with which to manufacture package substrates, and so on.

The quality rating unit 70 performs ratings in accordance with the quality standard, and ranks (S17) the plurality of wiring candidates. Because the number of wiring candidates of this embodiment is 1, the rank becomes the first when the quality rating unit 70 implements the processing. The concrete example of quality rating is described in the embodiment set forth later on.

A wiring candidate output unit 80 then outputs (wiring candidate output step) the generated wiring candidate and quality rating. When a plurality of wiring candidates is generated, the wiring candidate selected by the user is used at the package substrate design 101 (FIG. 3).

The operation of the circuit wiring system 100 has thus been set forth.

The circuit wiring system 100 exemplified in this embodiment is equipped with the wiring candidate generation function, wiring rule check function, and wiring quality rating function, and capable of determining the BGA free connection routes automatically. Thus, the quality improvement as well as the efficiency of circuit designing can be realized.

In this way, the BGA free connection routes can be automatically determined. Because the wiring candidates can be determined as one type, search time can be quite short. Thus, the wiring possibility can be determined instantaneously, and the appropriate combination of the wiring routes with short wiring length, wire bond pads 5, and solder ball connection pads can be determined. Note that the wiring route determination algorithm given as one example in this embodiment can be used for the CSP, a type of the BGA, or wiring routes of other substrates. Furthermore, by setting the prohibition conditions or wiring impossible area for the combination of wire bond pads 5 and solder ball connection pads 2, it can be applied to complicate BGA wirings, too. It is also applied to a case when the user specifies part of the combination of wire bond pads 5 and solder ball connection pads 2 and the wiring routes, then the rest of the combination of wire bond pads and the solder ball connection pads and the wring routes is automatically determined.

Embodiment 2

In this embodiment, a concrete example of actually generating wiring candidates is explained by specifying the number of wiring candidates as 10.

FIG. 22 gives the design conditions to be used in this embodiment. Compared to the explanation given in FIG. 6 for embodiment 1, the following items are added.

Figure 25:
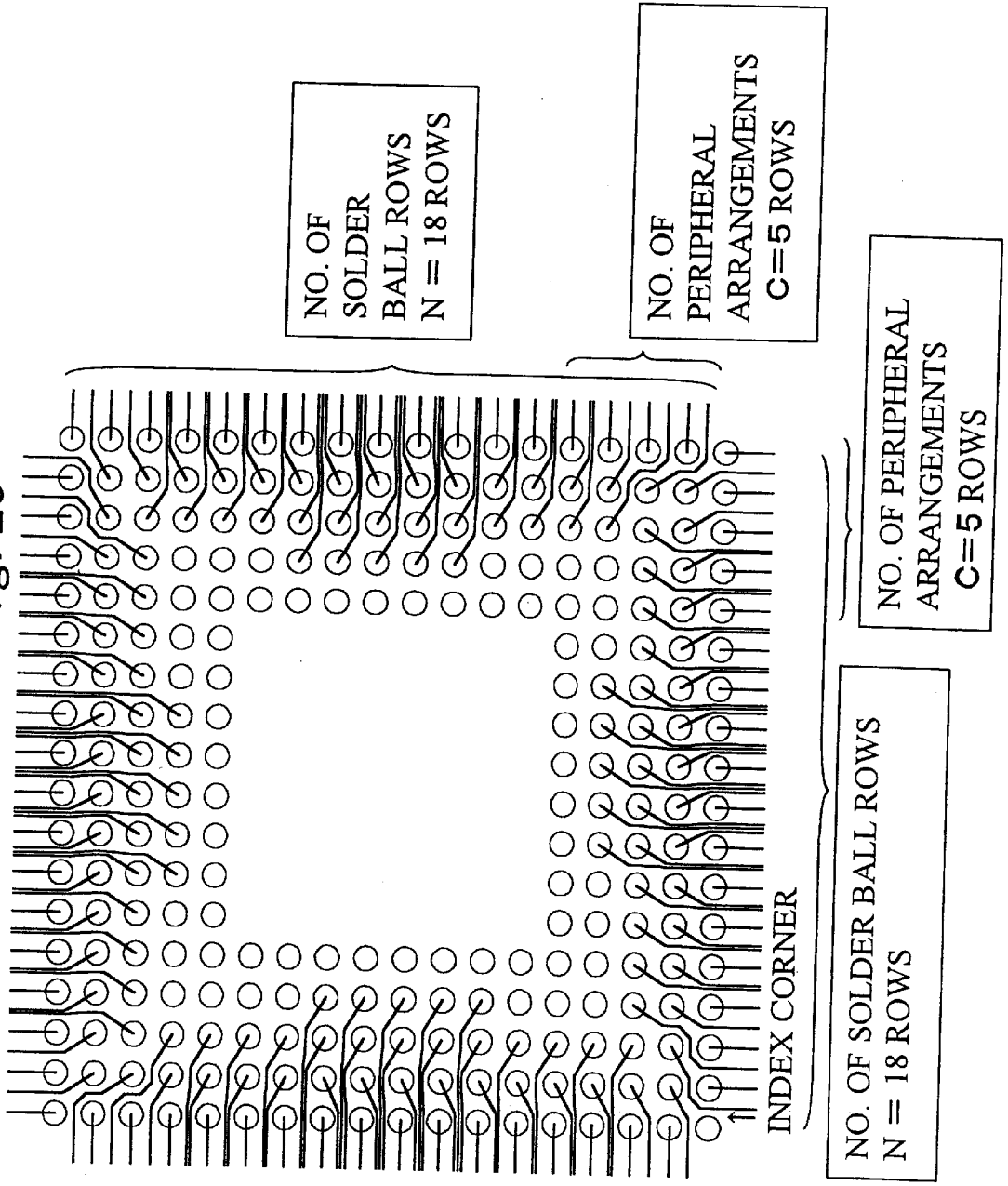
FIG. 25 shows a first wiring candidate generated in an example of embodiment 2.
Figure 26:
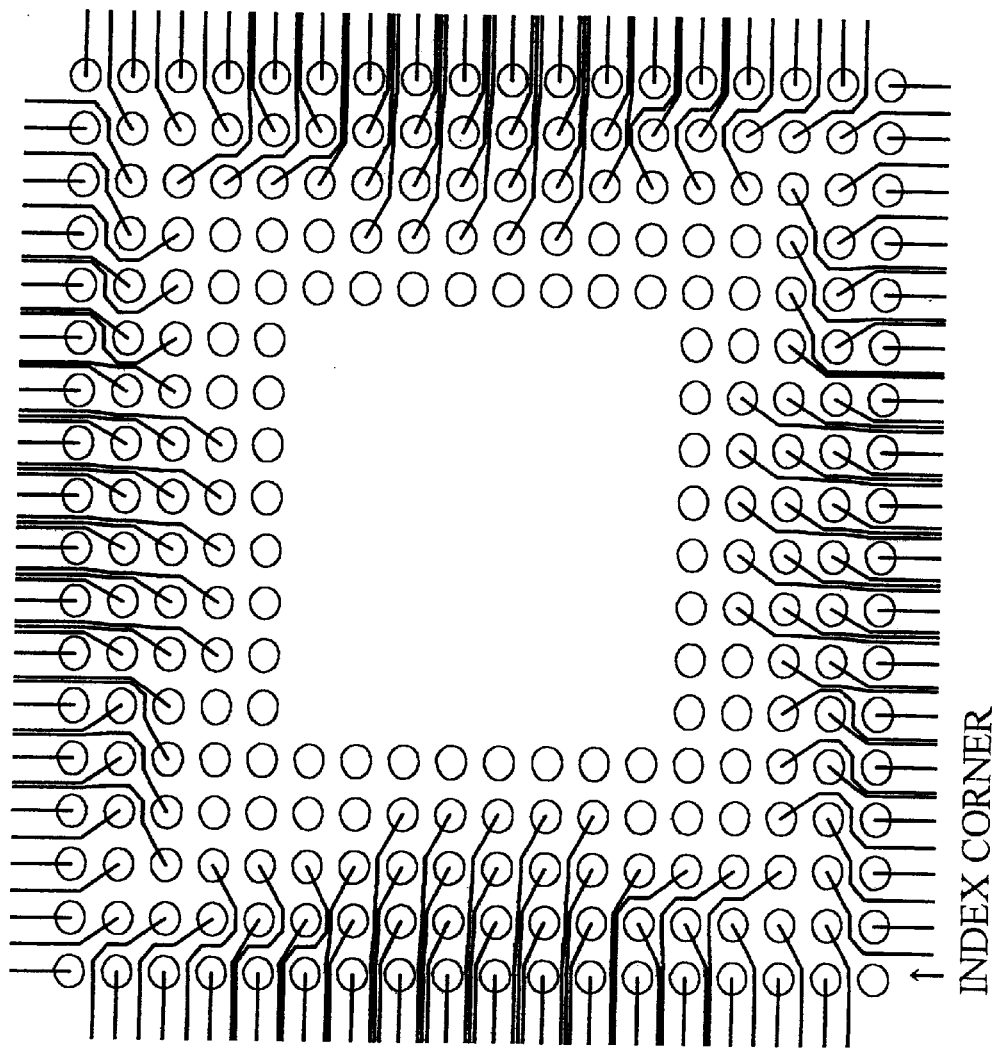
FIG. 26 shows a second wiring candidate generated in an example of embodiment 2.
Figure 27:
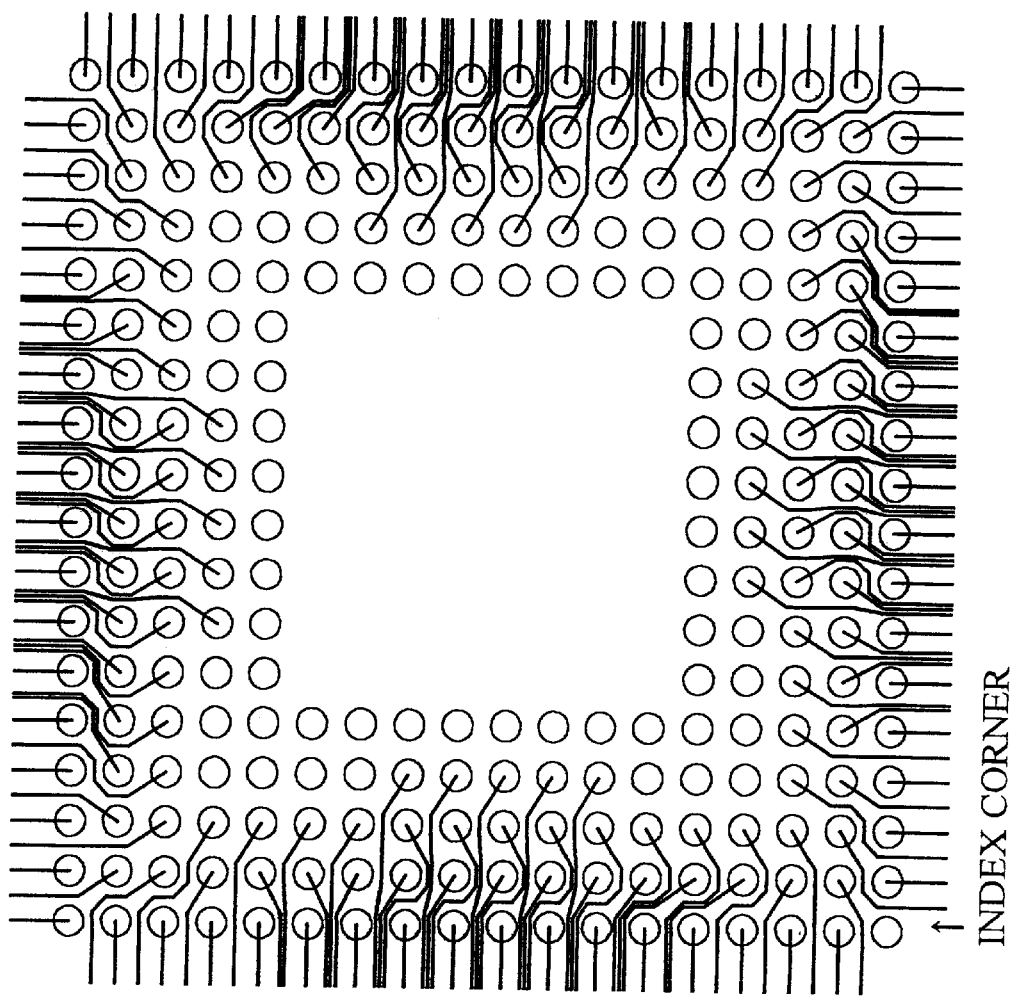
FIG. 27 shows a third wiring candidate generated in an example of embodiment 2.
Figure 28:
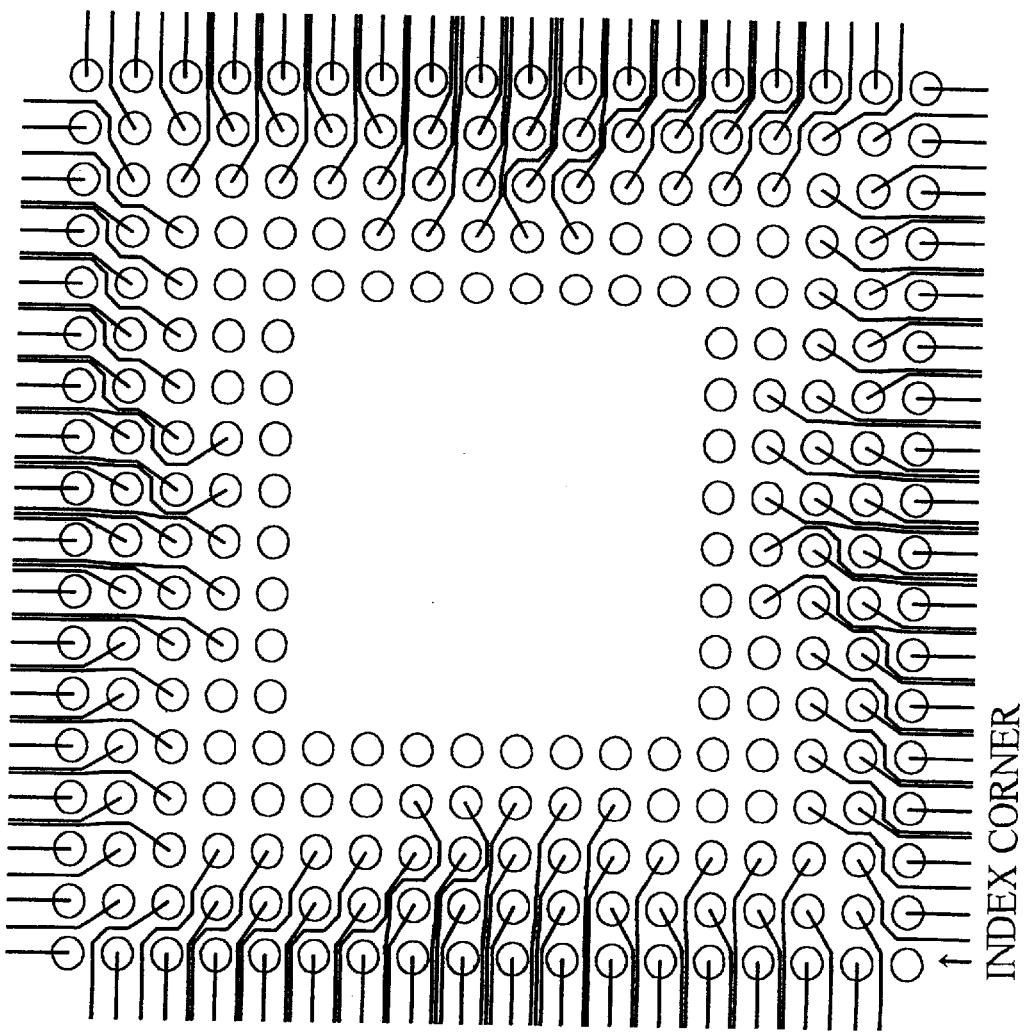
FIG. 28 shows a fourth wiring candidate generated in an example of embodiment 2.
Figure 29:
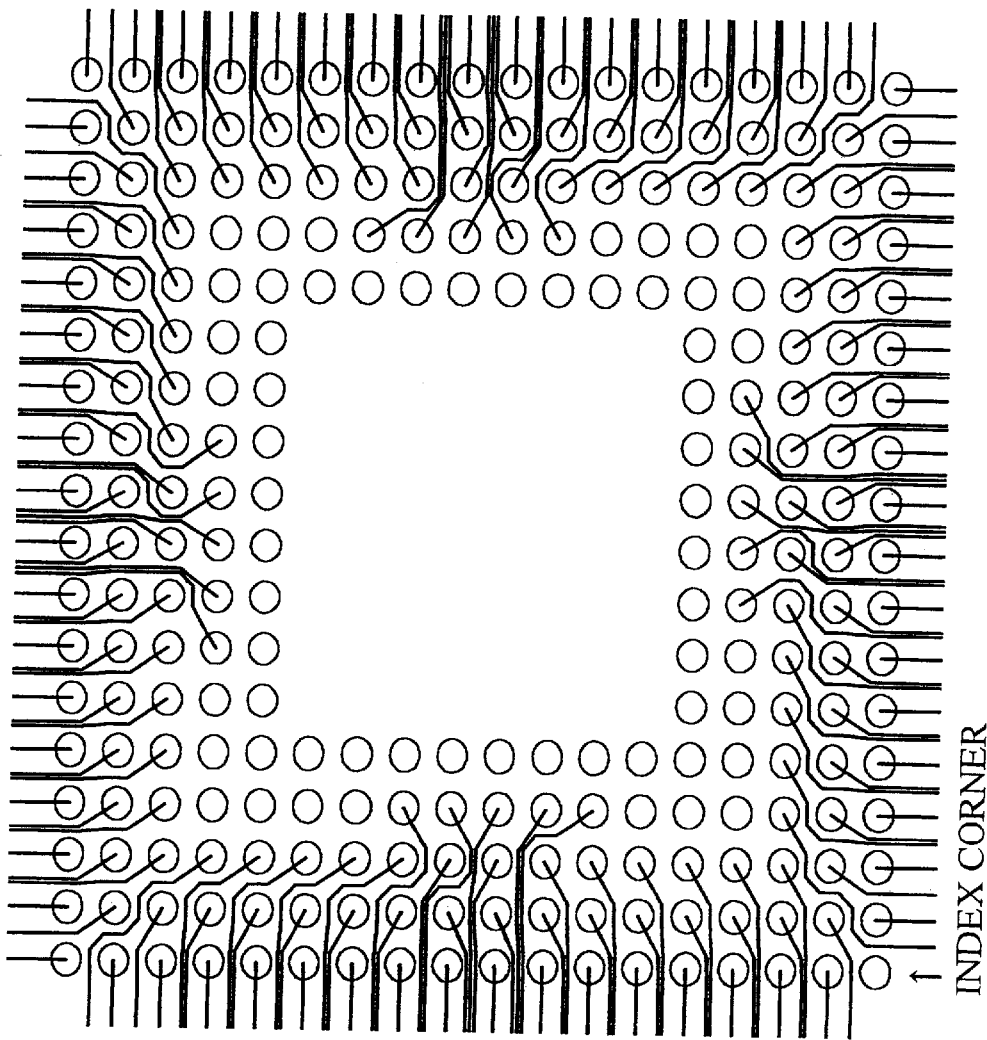
FIG. 29 shows a fifth wiring candidate generated in an example of embodiment 2.

The number of peripheral arrangements (C) indicates up to how many rows from the outside of the wiring area is included as the wiring area. FIG. 25 illustrates the number of peripheral arrangements (C).

The diagonal land connection indicates whether or not the solder ball connection pads 2 arranged on diagonal lines are to be connected. In this embodiment, connection is made from one side of the divided wiring area.

Wiring to an index corner indicates whether or not the solder ball connection pads 2 arranged at the corner of the wiring areas are to be connected. In the embodiment, wiring is indicated to be performed. FIG. 25 shows the index corner.

It is also possible to specify the design restrictions other than the above.

The configuration of the circuit wiring system 100 and the generation process of wiring candidates are the same as those of embodiment 1, and therefore, the explanation is omitted.

FIG. 23 and FIG. 24 show the result of the quality ratings of the wiring candidates generated based on FIG. 22.

FIG. 23 gives the rating by electrical characteristics.

FIG. 24 gives the rating by electrical characteristics and mechanical characteristics.

The electrical characteristics and the mechanical characteristics in FIG. 24 rate one on one, but it is possible to weigh in either of the two characteristics.

This embodiment represents a case in which the following items are rated as the quality standard.

The total wiring length indicates the total length (mm) of all wirings.

The maximum route length indicates the maximum length (mm) among all wiring routes.

The wiring length dispersion indicates that the smaller the value is, the less the dispersion becomes.

The simplicity indicates that the smaller the value is, the simpler the wiring becomes. Simplicity means that the wirings have less curves.

As for the mechanical characteristics, a case of making the cost as the rating item is shown.

With regard to the quality standard, the above items are not limitative, and other rating items can be arbitrarily added to the rating.

FIG. 25 to FIG. 29 show the top five wiring candidates selected by the quality rating, among the wiring candidates generated as one example based on the design conditions of FIG. 22.

As shown in figures, the example of this embodiment shows that the wiring routes are laid out within the scope indicated by the number of peripheral arrangements (C) of the wiring areas of the solder ball connection pads 2.

As is described in embodiment 1, because the wiring plan generation unit 62 selects a wiring pattern at random among the plurality of wiring patterns generated by the wiring pattern generation unit 61, the same plurality of wiring candidates is not always generated even when the wiring candidates are generated under the same conditions. However, an optimum wiring candidate can be generated because the restrictions are added at the time of wiring pattern generation so that the optimum wiring routes are generated at the time of wiring pattern generation, and the random number for random selection can be set as an experience.

The wiring candidates generated as above are shown to the user, and a package substrate is generated based on the wiring candidate finally adopted by the user, and circuit design which connects the plurality of solder ball connection pads 2 and the plurality of wire bond pads 5 freely can be performed efficiently.

In this way, the circuit wiring system shown as one example in this embodiment not only generates wiring candidates and checks the wiring candidates based on the wiring rules, but also rates the plurality of wiring candidates to rank them, and is capable of generating the optimum wiring candidates and selecting the generated wiring candidates efficiently.

Embodiment 3

In this embodiment, a case of square shape of an array of the plurality of first pins, in concrete, the solder ball connection pads 2 is rectangular is explained.

For the case in which the array of the solder ball connection pads 2 is rectangular, similar to FIG. 14 shown for embodiment 1, a rectangular entire wiring area is divided into each wiring area unit with diagonal lines.

Figure 30:
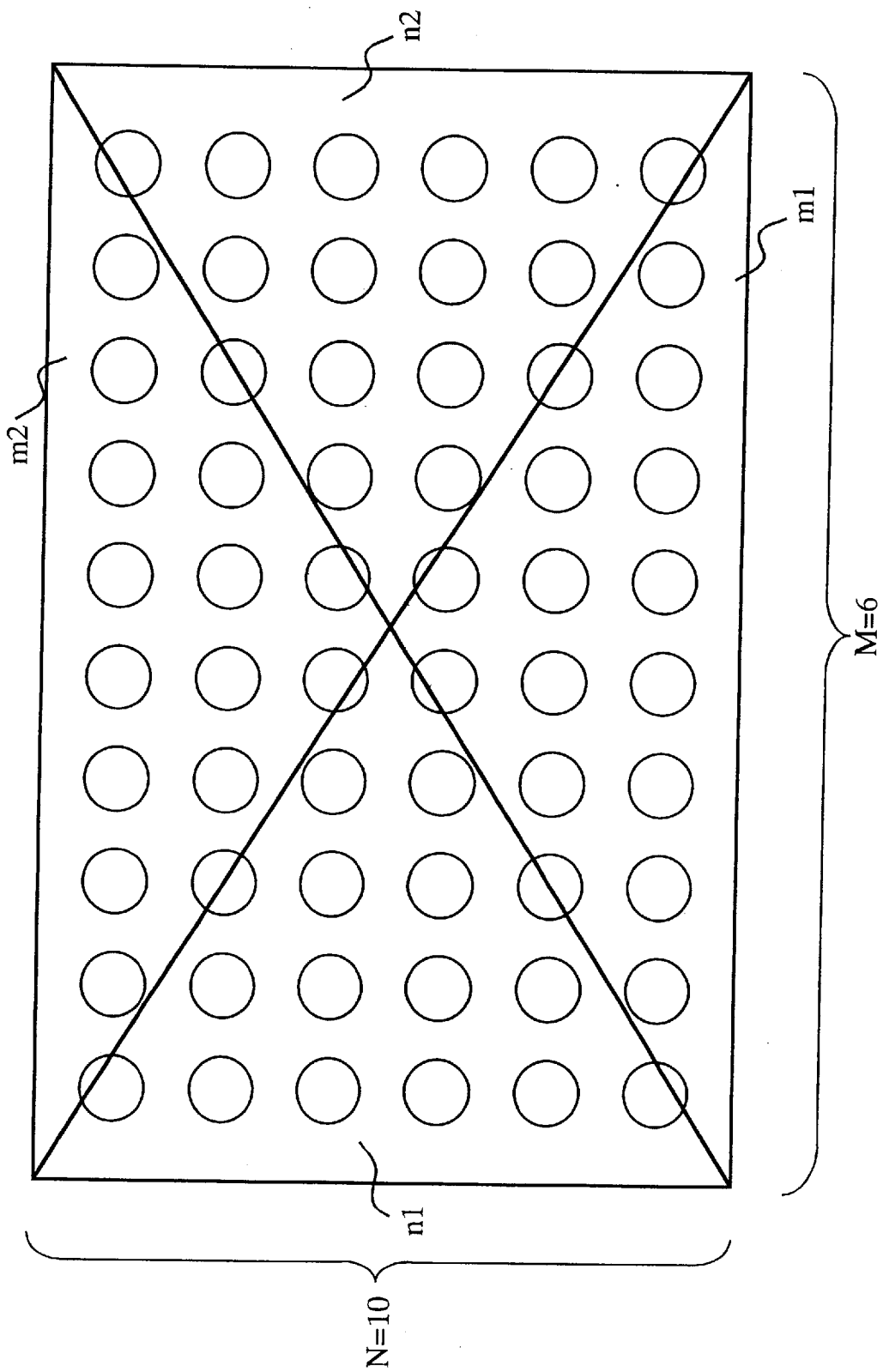
FIG. 30 shows a case in which an application is made to a rectangular package substrate shown in embodiment 4.

FIG. 30 shows a case in which the rectangular entire array area is divided into four wiring area units with diagonal lines. FIG. 30 represents an example of a rectangular when the number of solder ball connection pads 2 is N×M (N by M) with N being 10 and M being 6. Among the wiring area units divided by the diagonal lines, the wiring area units n1 and n2 have the same solder ball connection pads 2 array, and the wiring area units m1 and m2 have the same solder ball connection pads 2 array. In this case, the wiring pattern generation unit 61 has only to generate a plurality of wiring patterns in unit of n1 and m1 wiring area. It is necessary to determine in which area the solder ball connection pads 2 on the diagonal lines are included in advance so that the arrays of n1 and n2, m1 and m2 solder ball connection pads 2 becomes contrast, respectively.

The wiring plan generation unit 62 generates wiring routes for each wiring area unit according to the plurality of wiring patterns of the two wiring area units n1 and m1 generated by the wiring pattern generation unit 61. Then, the generated wiring routes are copied into the wiring area units which are the same wiring area units, respectively, in order to create wiring plans.

Therefore, one plurality of wiring patterns generated by the wiring pattern generation unit 61 is added compared with embodiment 1.

Embodiment 4

In this embodiment, a case of freely connecting the plurality of wire bond pads 5 (the second pins) to part of solder ball connection pads 2 which is among the plurality of solder ball connection pads 2 (the first pins) existing in the wiring areas is explained.

In such a case, the information of the first pins which cannot be connected is stored in the designing of wiring rules in the design condition memory 41.

In checking the wiring candidates, as the wiring rule check unit 63 eliminates the wiring plans of connecting the wiring routes to the first pins which cannot be connected, the enablement is made.

In generating wiring patterns, it is possible not to connect the wiring routes to specific solder ball connection pads 2. In this case, the information of the solder ball connection pads 2 not to be connected is stored as the design condition beforehand, and enablement is made as the wiring pattern generation unit 61 generates the wiring patterns based on the above information. In concrete, the realization is conceivable by adding the restriction information in the array conditions shown in FIG. 22.

In this embodiment, it is necessary to calculate the number of unconnected lines by considering the plurality of first pins which is excluded from the connection target.

Embodiment 5

In embodiment 1, a case of dividing the wiring area into four is explained, but it is not necessarily divided into four. It is possible to divide into eight. Or as shown in FIG. 7, any division method can be applied if the method is capable of generating wiring patterns which include the in-area wiring routes and connecting solder ball connection pads 2 in each solder ball connection pad area and generating wiring routes by combining each wiring patterns.

According to the circuit wiring system explained as one example of embodiment of the present invention, free connection routes such as BGA, etc., can be automatically determined.

Moreover, according to the circuit wiring system and method, circuit wiring routes can be efficiently laid out so as to improve quality.

In addition, according to the circuit wiring system and method, an optimum wiring candidate can be easily selected among a plurality of wiring candidates by rating quality.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A circuit wiring system, comprising:
   a design condition memory for storing a layout information of a first pin area in which a plurality of first pins is arrayed two-dimensionally on a plane, a layout information of a second pin area in which a plurality of second pins to be connected with each of the plurality of first pins is arranged, and a design condition of a wiring route for connecting the plurality of first pins and the plurality of second pins, and
   a wiring candidate generator for generating at least one wiring candidate by generating a connection combination for the plurality of first pins and the plurality of second pins, by laying out a plurality of wiring routes including a wiring route which connects at least one of the second pins to one of the first pins passing through two adjacent first pins in the first pin area, based on the design conditions stored in the design condition memory.

2. The circuit wiring system of claim 1, wherein the wiring candidate generator divides the first pin area into a plurality of divided first pin areas, and lays out a bunch of wiring routes passing through each of the plurality of divided first pin areas, as a plurality of in-area wiring routes and generates the plurality of wiring routes by combining the plurality of in-area wiring routes laid out in each of the plurality of divided first pin areas.

3. The circuit wiring system of claim 1, wherein the wiring candidate generator divides the first pin area into a near area closer to the second area and a far area and a far area far from the second pin area, and lays out a bunch of wiring routes passing through the near area as a plurality of in-area wiring routes which are used to connect the plurality of second pins to the plurality of first pins arranged in the far area, divides the far area further into a near area closer to the second pin area and a far area far from the second pin area, and generates two or more sets of a plurality of in-area wiring routes, for a plurality of divided first pin areas by repeating the process of laying out a plurality of in-area wiring routes on a divided near area, connects two or more sets of the plurality of the in-area wiring routes in the plurality of areas, in order to determine the plurality of wiring routes between the plurality of first pins and the plurality of second pins.

4. The circuit wiring system of claim 3, wherein the wiring candidate generator calculates a number of unconnected lines by subtracting the number of the plurality of first pins arranged in the near area and targeted to be connected to the plurality of second pins from the number of connections of the plurality of wiring routes to be laid out in the first pin area, and lays out the plurality of in-area wiring routes as many as the number of unconnected lines in the near area.

5. The circuit wiring system of claim 4, wherein the near area is one row area on which the plurality of first pins is arrayed.

6. The circuit wiring system of claim 5, wherein the design condition stored in the design condition memory includes the plurality of wiring rules one of rules specifying a maximum number for wiring for wiring between the two adjacent first pins of the one row.

7. The circuit wiring system of claim 6, wherein the wiring candidate generator further includes a wiring pattern generation unit which generates a plurality of wiring patterns for each of the divided first pin areas, each of the plurality of wiring routes including the layout information of the plurality of in-area wiring routes for the number of unconnected lines for each first pin area, and information which specifies the plurality of in-area wiring routes to be connected to the plurality of first pins, and a wiring plan generation unit which selects each of the plurality of wiring patterns in each of the divided first pin areas, and generates a plurality of wiring plans by laying out the plurality of wiring routes by connecting the each of the plurality of wiring patterns selected from each of the divided first pin areas, and a wiring rule check unit which selects a wiring plan satisfying the wiring rules stored in the design condition memory, as the wiring candidate.

8. The circuit wiring system of claim 7, wherein the wiring pattern generation unit lays out the plurality of in-area wiring routes passing between the two adjacent first pins of the one row from a center to outsides preferentially between the two adjacent first pins arranged in a center of the one row, and then lays out sequentially between the two adjacent first pins arranged outside of each row.

9. The circuit wiring system of claim 7, wherein the wiring rule check unit selects the wiring plan which makes the number of connections between the two adjacent first pins below or equal to the maximum number for wiring as the wiring candidate.

10. The circuit wiring system of claim 7, wherein the plurality of first pins is arrayed in a quadrangle shape in the first pin area, the plurality of second pins is arranged outside the first pin area, the wiring pattern generation unit divides a wiring area to a plurality of divided wiring areas in each of which the wiring routes are laid out, and generates the plurality of wiring patterns in the divided first pin areas for each of the divided wiring areas, and the wiring plan generation unit generates the plurality of wiring plans for each of the plurality of divided wiring area, and generates the wiring plan for the entire wiring area by connecting the plurality of wiring plans generated.

11. The circuit wiring system of claim 1, wherein the circuit wiring system further includes a quality standard memory for storing a quality standard which becomes the standard for rating the quality of the wiring, and a quality rating unit for rating the quality of the wiring candidates generated by the wiring candidate generator based on the quality standard stored in the quality standard memory.

12. The circuit wiring system of claim 11, wherein the wiring candidate generator generates the plurality of wiring candidates, and the quality rating unit rates the quality of the plurality of the wiring candidates.

13. The circuit wiring system of claim 1, wherein the plurality of first pins is solder ball connection pads of a ball grid array (BGA) package, and the plurality of second pins is wire bond pads to be connected with semi-conductor elements with a wire.

14. A circuit wiring method for generating a wiring candidate by laying out a wiring route between a plurality of first pins arrayed two-dimensionally on a plane, and a plurality of second pins to be connected with each of the plurality of first pins is arranged on the plane and connected with the plurality of first pins, comprising the steps of:

inputting a layout information of a first pin area in which the plurality of first pins is arrayed, a layout information of a second pin area in which the plurality of second pins is arranged, and a design condition of a wiring route for connecting the plurality of first pins and the plurality of second pins, and generating at least one wiring candidate by generating a connection combination for the plurality of first pins and the plurality of second pins, by laying out a plurality of wiring routes including a wiring route which connects at least one of the second pins to one of the first pins passing through two adjacent first pins in the first pin area, based on the design conditions input by the design condition storing step.

15. A semi-conductor package substrate provided with a plurality of first pins arrayed two-dimensionally on a plane, and a plurality of second pins arranged on a same plane, to be connected to the plurality of first pins comprising:

a design condition memory for storing a layout information of a first pin area in which the plurality of first pins is arrayed two-dimensionally on the plane, a layout information of a second pin area in which the plurality of second pins to be connected with each of the plurality of first pins is arranged, and a design condition of a wiring route for connecting the plurality of first pins and the plurality of second pins, and a wiring candidate generator for generating at least one wiring candidate by generating a connection combination for the plurality of first pins and the plurality of second pins, by laying out a plurality of wiring routes including a wiring route which connects at least one of the second pins to one of the first pins passing through two adjacent first pins in the first pin area, based on the design conditions stored in the design condition memory.

16. A semi-conductor package provided with a package substrate having a plurality of first pins arrayed two-dimensionally on a plane and a plurality of second pins arranged on a same plane and to be connected to each of the plurality of first pins, comprising:
- a design condition memory for storing a layout information of a first pin area in which the plurality of first pins is arrayed two-dimensionally on a plane, a layout information of a second pin area in which a plurality of second pins is arranged and connected to each of the plurality of first pins, and a design condition of a wiring route for connecting the plurality of first pins and the plurality of second pins, and
- a wiring candidate generator for generating at least one wiring candidate by generating a connection combination for the plurality of first pins and the plurality of second pins, by laying out a plurality of wiring routes including a wiring route which connects at least one of the second pins to one of the first pins passing through two adjacent first pins in the first pin area, based on the design conditions stored in the design condition memory.

17. A circuit wiring system, comprising:

- a design condition memory for storing a layout information of a first pin area in which a plurality of first pins is arrayed two-dimensionally on a plane, a layout information of a second pin area in which a plurality of second pins to be connected with each of the plurality of first pins is arranged, and a design condition of a wiring route for connecting the plurality of first pins and the plurality of second pins, and

- a wiring candidate generator for laying out the plurality of wiring routes including at least one of the wiring routes passing through the plurality of first pins, and generating a wiring candidate for connecting with each of the plurality of second pins and the plurality of first pins, using the plurality of wiring routes, based on design conditions stored in the design condition memory.

* * * * *